US007827252B2

(12) United States Patent  (10) Patent No.: US 7,827,252 B2
Hopmann et al.  (45) Date of Patent: Nov. 2, 2010

(54) NETWORK DEVICE MANAGEMENT

(75) Inventors: Alex Hopmann, Seattle, WA (US); Brett Marl, Seattle, WA (US); Ashley Colin Yakeley, Seattle, WA (US); Nick Holt, Seattle, WA (US); Joel Hynoski, Seattle, WA (US); Steven Bush, Redmond, WA (US); Matthew Tebbs, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 521 days.

(21) Appl. No.: 11/457,783

(22) Filed: Jul. 14, 2006

(65) Prior Publication Data

US 2007/0130286 A1  Jun. 7, 2007

Related U.S. Application Data

(63) Continuation-in-part of application No. 11/297,809, filed on Dec. 7, 2005.

(60) Provisional application No. 60/634,432, filed on Dec. 7, 2004.

(51) Int. Cl.
 *G06F 15/16* (2006.01)
(52) U.S. Cl. .................................................. 709/217
(58) Field of Classification Search .................. 709/217
 See application file for complete search history.

(56) References Cited

U.S. PATENT DOCUMENTS

| 5,383,178 | A |   | 1/1995  | Unverrich |
|-----------|---|---|---------|-----------|
| 5,396,485 | A |   | 3/1995  | Ohno et al. |
| 5,768,483 | A | * | 6/1998  | Maniwa et al. ............. 358/1.15 |
| 5,774,667 | A | * | 6/1998  | Garvey et al. ............... 709/222 |
| 5,974,237 | A | * | 10/1999 | Shurmer et al. ............. 709/224 |
| 5,978,568 | A |   | 11/1999 | Abraham et al. |
| 6,006,272 | A |   | 12/1999 | Aravamudan et al. |
| 6,023,723 | A |   | 2/2000  | McCormick et al. |
| 6,456,306 | B1 |  | 9/2002  | Chin et al. |
| 6,530,018 | B2 |  | 3/2003  | Fleming |

(Continued)

FOREIGN PATENT DOCUMENTS

| JP | 2001-222497 A    | 8/2001  |
| JP | 2001-352328 A    | 12/2001 |
| KR | 2004-0047209 A1  | 7/2004  |
| KR | 10-2005-0031175 A | 4/2005 |
| KR | 2005-0078541 A   | 8/2005  |
| KR | 2005/0094247 A   | 9/2005  |
| WO | WO 2008/156898   | 12/2008 |
| WO | WO 2009/011962   | 1/2009  |
| WO | WO 2009/011963   | 1/2009  |
| WO | WO 2009-011964   | 1/2009  |
| WO | WO 2009/011965   | 1/2009  |
| WO | WO 2009/011966   | 1/2009  |

OTHER PUBLICATIONS

PCT Notification of the International Search Report and the Written Opinion of the International Searching Authority, or the Declaration, International Application No. PCT/US2008/063318, mailed Sep. 25, 2008, 6 pgs.

(Continued)

*Primary Examiner*—Vivek Srivastava
*Assistant Examiner*—Minh-Chau Nguyen
(74) *Attorney, Agent, or Firm*—Patent Capital Group

(57) ABSTRACT

A network device management tool that allows a client, such as a network management tool or network device setup utility, to reliably obtain information about a network device. Variations of the network device management tool may alternately or additionally allow a client to deliver information to the network device, such as instructions to control the operation of the network device. The network device management tool may be incorporated into the network device.

20 Claims, 8 Drawing Sheets

U.S. PATENT DOCUMENTS

| | | |
|---|---|---|
| 6,584,074 B1 | 6/2003 | Vasamsetti et al. |
| 6,631,118 B1 | 10/2003 | Jones |
| 6,678,250 B1 | 1/2004 | Grabelsky et al. |
| 6,778,505 B1 | 8/2004 | Bullman et al. |
| 6,801,941 B1 | 10/2004 | Stephens et al. |
| 6,892,245 B1 | 5/2005 | Crump et al. |
| 6,954,785 B1 | 10/2005 | Martin et al. |
| 6,965,614 B1 | 11/2005 | Osterhout et al. |
| 6,980,556 B2 | 12/2005 | Vimpari |
| 7,020,701 B1 | 3/2006 | Gelvin et al. |
| 7,020,720 B1 | 3/2006 | Donahue et al. |
| 7,080,141 B1 | 7/2006 | Baekelmans et al. |
| 7,111,054 B2 | 9/2006 | Lo |
| 7,155,493 B1 | 12/2006 | Weber |
| 7,177,957 B2 | 2/2007 | Vance |
| 7,200,551 B1 | 4/2007 | Senez |
| 7,240,106 B2 | 7/2007 | Cochran et al. |
| 7,269,653 B2 | 9/2007 | Mentze et al. |
| 7,283,517 B2 | 10/2007 | Yan et al. |
| 7,319,873 B2 | 1/2008 | Zhang et al. |
| 7,337,910 B2 | 3/2008 | Cartmell et al. |
| 7,340,512 B2 | 3/2008 | Cochran et al. |
| 7,388,839 B2 | 6/2008 | Chafle et al. |
| 7,392,310 B2* | 6/2008 | Motoyama et al. .......... 709/224 |
| 7,421,466 B2 | 9/2008 | Haines |
| 7,457,737 B2* | 11/2008 | Patiejunas .................... 703/14 |
| 7,460,546 B2 | 12/2008 | Anderson, IV |
| 7,475,133 B2 | 1/2009 | Nuggehalli |
| 7,499,999 B2 | 3/2009 | Ocepek et al. |
| 7,509,415 B2 | 3/2009 | Baekelmans et al. |
| 7,545,762 B1 | 6/2009 | McConnell et al. |
| 7,565,418 B2 | 7/2009 | Marl et al. |
| 7,581,039 B2 | 8/2009 | Martinez et al. |
| 7,603,710 B2 | 10/2009 | Harvey et al. |
| 7,657,612 B2 | 2/2010 | Manchester et al. |
| 2001/0039580 A1 | 11/2001 | Walker et al. |
| 2002/0004935 A1 | 1/2002 | Huotari et al. |
| 2002/0010866 A1 | 1/2002 | McCullough et al. |
| 2002/0026503 A1 | 2/2002 | Bendinelli et al. |
| 2002/0026505 A1 | 2/2002 | Terry |
| 2002/0112076 A1 | 8/2002 | Rueda et al. |
| 2002/0116544 A1* | 8/2002 | Barnard et al. ............... 709/324 |
| 2002/0147938 A1 | 10/2002 | Hamilton et al. |
| 2002/0161865 A1 | 10/2002 | Nguyen |
| 2002/0161867 A1 | 10/2002 | Cochran et al. |
| 2002/0174207 A1 | 11/2002 | Battou |
| 2002/0196463 A1* | 12/2002 | Schlonski et al. .......... 358/1.15 |
| 2003/0005112 A1 | 1/2003 | Krautkremer |
| 2003/0033402 A1* | 2/2003 | Battat et al. ................. 709/224 |
| 2003/0041238 A1 | 2/2003 | French et al. |
| 2003/0061336 A1 | 3/2003 | Van Den Bosch et al. |
| 2003/0069947 A1 | 4/2003 | Lipinski |
| 2003/0078999 A1 | 4/2003 | Lund et al. |
| 2003/0086425 A1 | 5/2003 | Bearden et al. |
| 2003/0115298 A1 | 6/2003 | Baker |
| 2003/0115314 A1* | 6/2003 | Kawashima ................ 709/224 |
| 2003/0195937 A1 | 10/2003 | Kircher et al. |
| 2003/0200303 A1 | 10/2003 | Chong |
| 2003/0200318 A1 | 10/2003 | Chen et al. |
| 2003/0229688 A1 | 12/2003 | Liang |
| 2004/0003292 A1 | 1/2004 | Kato |
| 2004/0030620 A1 | 2/2004 | Benjamin et al. |
| 2004/0040023 A1 | 2/2004 | Ellis et al. |
| 2004/0155899 A1 | 8/2004 | Conrad |
| 2004/0162986 A1 | 8/2004 | Metzger |
| 2004/0193709 A1 | 9/2004 | Selvaggi et al. |
| 2004/0199647 A1 | 10/2004 | Ramarao et al. |
| 2004/0236759 A1 | 11/2004 | Young |
| 2005/0018241 A1* | 1/2005 | Azami ....................... 358/1.15 |
| 2005/0050189 A1 | 3/2005 | Yang |
| 2005/0063350 A1 | 3/2005 | Choudhury et al. |
| 2005/0078681 A1 | 4/2005 | Sanuki et al. |
| 2005/0086197 A1* | 4/2005 | Boubez et al. .................. 707/1 |
| 2005/0091504 A1 | 4/2005 | Shirogane |
| 2005/0114490 A1 | 5/2005 | Redlich et al. |
| 2005/0125527 A1 | 6/2005 | Lu et al. |
| 2005/0149626 A1 | 7/2005 | Manchester et al. |
| 2005/0184852 A1 | 8/2005 | Lee et al. |
| 2005/0198274 A1 | 9/2005 | Day |
| 2005/0229238 A1 | 10/2005 | Ollis et al. |
| 2005/0234568 A1 | 10/2005 | Chung et al. |
| 2005/0234683 A1* | 10/2005 | Graves et al. ................... 703/1 |
| 2005/0235227 A1* | 10/2005 | Martineau et al. ........... 715/855 |
| 2005/0240758 A1 | 10/2005 | Lord et al. |
| 2006/0036847 A1 | 2/2006 | Bush et al. |
| 2006/0037036 A1 | 2/2006 | Min et al. |
| 2006/0101109 A1* | 5/2006 | Nishio ....................... 709/200 |
| 2006/0106918 A1 | 5/2006 | Evert et al. |
| 2006/0120293 A1 | 6/2006 | Wing |
| 2006/0129664 A1 | 6/2006 | Reimert et al. |
| 2006/0153080 A1 | 7/2006 | Palm |
| 2006/0168195 A1 | 7/2006 | Maturana et al. |
| 2006/0168263 A1 | 7/2006 | Blackmore |
| 2006/0280189 A1 | 12/2006 | McRae et al. |
| 2006/0291443 A1 | 12/2006 | Harrington et al. |
| 2007/0022185 A1 | 1/2007 | Hamilton et al. |
| 2007/0058567 A1 | 3/2007 | Harrington et al. |
| 2007/0076621 A1 | 4/2007 | Malhotra et al. |
| 2007/0106768 A1 | 5/2007 | Frietsch et al. |
| 2007/0111568 A1 | 5/2007 | Ferrari et al. |
| 2007/0133569 A1 | 6/2007 | Lee et al. |
| 2007/0204150 A1 | 8/2007 | Jokela et al. |
| 2007/0268506 A1 | 11/2007 | Zeldin |
| 2007/0268515 A1 | 11/2007 | Freund et al. |
| 2007/0268516 A1 | 11/2007 | Bugwadia et al. |
| 2008/0037552 A1 | 2/2008 | Dos Remedios et al. |
| 2008/0049779 A1 | 2/2008 | Hopmann et al. |
| 2008/0052384 A1 | 2/2008 | Marl et al. |
| 2008/0065760 A1 | 3/2008 | Damm et al. |
| 2008/0070603 A1 | 3/2008 | Mao |
| 2008/0134164 A1 | 6/2008 | Stich et al. |
| 2009/0017832 A1 | 1/2009 | Tebbs et al. |
| 2009/0019141 A1 | 1/2009 | Bush et al. |
| 2009/0019147 A1 | 1/2009 | Ahlers et al. |
| 2009/0019314 A1 | 1/2009 | Younger et al. |
| 2009/0052338 A1 | 2/2009 | Kelley et al. |
| 2009/0055514 A1 | 2/2009 | Tebbs et al. |
| 2010/0020694 A1 | 1/2010 | Jones |

OTHER PUBLICATIONS

U.S. Appl. No. 11/696,638, filed Apr. 4, 2007, entitled "Network Management Providing Network Health Information and Lockdown Security," Inventor(s) Steve Bush et al.

Marcia Zangrilli, et al., "Using Passive Traces of Application Traffic in a Network Monitoring System," copyright 2004 IEEE.

Kazuya Kubo, et al., "Hybrid Peer-to-Peer System for Network Monitoring of Field Devices," Downloaded May 14, 2009 at 10:08 from IEEE Xplore, copyright 2003 SICE, 6 pages.

International Search Report for International Application No. PCT/US2008/063335 mailed Sep. 22, 2008 (1 page).

Written Opinion of the International Searching Authority for International Application No. PCT/US2008/063335 mailed Sep. 22, 2008 (4 pages).

International Search Report for International Application No. PCT/US2008/063308 mailed Oct. 30, 2008 (2 pages).

Written Opinion of the International Searching Authority for International Application No. PCT/US2008/063308 mailed Oct. 30, 2008 (4 pages).

International Search Report for International Application No. PCT/US2008/063333 mailed Sep. 26, 2008 (2 pages).

Written Opinion of the International Searching Authority for International Application No. PCT/US2008/063333 mailed Sep. 26, 2008 (4 pages).

International Search Report for International Application No. PCT/US2008/059490 mailed Apr. 21, 2009 (2 pages).

International Preliminary Report on Patentability issued Oct. 6, 2009 (1 page) and Writter Opinion of the International Searching Authority mailed Apr. 21, 2009 (3 pages) for International Application No. PCT/US2008/059490.

Notification Concerning Transmittal of International Preliminary Report on Patentability (1 page), International Preliminary Report on Patentability (1 page), and Written Report of the International Searching Authority (4 pages) mailed Jan. 28, 2010 for International Application No. PCT/US2008/063318.

Barb Bowman, "Introduction to Windows XP Service Pack 2," Published Aug. 25, 2004, 8 pages; © 2010 Microsoft Corporation http://www.microsoft.com/windowsxp/using/security/expert/bowman_introtosp2.mspx.

Microsoft TechNet, "The Cable Guy—Jun. 2004: The New Wireless Network Setup Wizard in Windows XP Service Pack 2," Published May 25, 2004; Updated Aug. 4, 2004, 10 pages; © 2010 Microsoft Corporation; http://technet.microsoft.com/en-us/library/bb878069.aspx.

Microsoft Corporation, "Windows Connect Now-UFD for Windows XP Specification,"© 2010, Updated Sep. 15, 2006, 1 page; http://www.microsoft.com/whdc/connect/Rally/WCN-UFD_XPspec.mspx.

Microsoft Corporation, "Windows Connect Now-UFD for Windows XP," Version 1.1 © 2010—Sep. 15, 2006, 33 pages; http://www.microsoft.com/whdc/connect/Rally/WCN-Netspec.doc.

Microsoft Corporation, "Windows Connect Now-UFD and Windows Vista Specification," Version 1.0 © 2010—Sep. 15, 2006, 1 page; http://www.microsoft.com/whdc/connect/Rally/WCN-UFD_Vistaspec.mspx.

Microsoft Corporation, "Windows Connect Now-UFD Windows Vista" Version 1.0 © 2010—Sep. 15, 2006, 28 pages; http://www.microsoft.com/whdc/connect/Rally/WCN-UFD_Vistaspec.doc.

Microsoft Corporation, "Windows Connect Now—Access Point has No USB Port in Wireless Networking," © 2010, printed Mar. 24, 2010, 2 pages; http://www.microsoft.com/connmunities/newsgroups/en-us/default.aspx?dg=microsoft.public.windows.networking.wireless&tid=c55b567e-fec3-43be-8bd1-a3216125c7f9&cat=en_US_d02fc761-3f6b-402c-82f6-ba1a8875c1a7&lang=en&cr=&sloc=en-us&m=1&p=1.

Flip Video, "Quick Start Guide: FlipshareTV," © 2009 Cisco Systems, Inc., 19 pages; http://www.theflip.com/pdf/en-US/FlipShareTVQuickStartGuide.pdf.

"Wi-Fi Certified™ for Wi-Fi Protected Setup™ : Easing the User Experience for Home and Small Office Wi-Fi® Networks," © 2007, 14 pages; http://www.wi-fi.org/files/kc/20090123_Wi-Fi_Protected_Setup.pdf.

"Cisco Access Router USB Flash Memory Module and USB eToken Hardware Installation Guide," © 2006 Cisco Systems, Inc., 12 pages; https://www.cisco.com/en/US/docs/routers/access/2800/hardware/notes/mithril.html.

"Wi-Fi Alliance™ for Wi-Fi Protected Setup Specification," Version 1.0h, Dec. 2006, 110 pages.

Byoung-Koo Kim/Jong-Su Jang/Tai M. Chung, Design of Network Security Control System for Cooperative Intrusion Detection, 2002, pp. 389-398.

International Preliminary Report on Patentability issued Jan. 19, 2010 (1 page) and Written Opinion of the International Searching Authority mailed Oct. 30, 2008 (4 pages) for International Application No. PCT/US2008/063308.

International Preliminary Report on Patentability issued Jan. 19, 2010 (1 page) and Written Opinion of the International Searching Authority mailed Sep. 26, 2008 (4 pages) for International Application No. PCT/US2008/063333.

International Preliminary Report on Patentability issued Jan. 19, 2010 (1 page) and Written Opinion of the International Searching Authority mailed Sep. 22, 2008 (4 pages) for International Application No. PCT/US2008/063335.

* cited by examiner

NETWORK DEVICE MANAGEMENT

RELATED APPLICATIONS

This application claims priority to U.S. patent application Ser. No. 11/297,809 filed on Dec. 7, 2005, entitled "Network Management" and naming Steve Bush et al. as inventors, which application in turn claims priority to U.S. Provisional Patent Application No. 60/634,432, filed Dec. 7, 2004, entitled "Network Management" and naming Steve Bush et al. as inventors, which applications are both incorporated entirely herein by reference.

FIELD OF THE INVENTION

The present invention is directed toward management of the devices and services hosted on a network. Various aspects of the invention are particularly suitable for assisting a network device setup utility or a network management tool in configuring or managing a device in a network.

BACKGROUND OF THE INVENTION

Computing devices have become commonplace tools in modern society, and even many small businesses and families now have one or more computing devices. In a small business, for example, multiple employees may use a computer, such as a desktop computer, laptop computer, personal digital assistant or "smart" wireless telephone. When a family shares a single residence, one or more family members may have a computer. Further, both businesses and personal residences may additionally employ one or more various computing appliances that incorporate or otherwise interact with computers. For example, a family member may use a digital music player, a printer, a refrigerator, a "Voice over Internet Protocol" telephone, a digital music server, a digital camera, or even an environmental control system that includes or otherwise interacts with a computer.

In order to optimize the use and flexibility of these computing devices, a business or family may link them together to form a small private network. Typically, each of the computing devices is connected to a router through a network adapter. The router then "routes" packets of data to and from each computing device. With this type of small private network, the router can in turn be connected to one or more larger private or public networks, such as the Internet. By sending and receiving messages through the router, each networked computing device may then communicate with computing devices outside of the private network. In this arrangement, the router serves as a "gateway" device that provides a gateway to outside of the private network.

While this type of small or "home" network can provide enhanced utility for its member computing devices, even a small network can be very difficult for a non-technical person to set up and maintain. Accordingly, various software developers have created tools to assist novice users in setting up or managing a small network. Conventionally, these tools were embedded in a larger software product, such as an operating system or a utility application. More recently, however, Pure Networks of Seattle, Wash. has developed a dedicated software application tool for managing small networks. This software application tool, available from Pure Networks under the name NETWORK MAGIC, is described in detail in U.S. Provisional Patent Application No. 60/634,432, filed Dec. 7, 2004, entitled "Network Management" and naming Steve Bush et al. as inventors, and U.S. patent application Ser. No. 11/297,809, filed on Dec. 7, 2005, entitled "Network Management" and naming Steve Bush et al. as inventors, which applications are incorporated entirely herein by reference.

While these tools provide varying degrees of assistance, their usefulness is influenced by the amount of information that they can obtain regarding computing devices in the network. For example, if the NETWORK MAGIC software application can accurately determine that a networked computing device is a network camera, it can open the appropriate ports on a small network's router to make the network camera accessible via the Internet, or present an appropriate user interface to manage the network camera or display the camera's video feed.

Currently, however, the amount of information that can reliably be obtained from a network device varies from device to device and from vendor to vendor. No reliable means exists to accurately identify the features and capabilities of a network device. For example, most small network routers conventionally host a Web page that lists various information for itself, such as its make, model, and manufacturer. This Web page typically will also allow a network administrator to view details about the router or control the operation of the router. Thus, this Web page may allow a network administrator to change the password the router uses for authentication. Other types of network devices, however, such as cameras, printers, network-attached storage devices, digital media adapters, and VoIP telephones, provide no formal uniform mechanism for obtaining information regarding the device.

Instead, each network device manufacturer has its own custom interface for accessing information regarding its network device. As a result, the NETWORK MAGIC tool, for example, must employ a variety of heuristics to determine information regarding each network device in a small network. The heuristics attempt to infer the type and capabilities of the network device. This methodology of device detection occasionally may be unreliable, as user modifications or software upgrades to the network device may invalidate the heuristics.

BRIEF SUMMARY OF THE INVENTION

Various examples of the invention relate to a network device management tool that allows a client service or "client" running on a remote computing device to reliably obtain information about and the capabilities of the network device hosting the network device management tool. With some examples of the invention, the network device management tool may alternately or additionally permit a client running on a separate computing device to reliably obtain information about the network device hosting the network device management tool, and then configure the network device for use on the network. For example, according to some embodiments of the invention, the network device management tool may permit a network management tool (or other suitable tool), running on a separate computing device, to deliver information to the network device such as instructions to control the operation of the network device. With still other embodiments of the invention, the network device management tool may alternately or additionally exchange information with a device setup utility designed to assist a user in configuring the network device hosting the network device management tool.

DETAILED DESCRIPTION OF THE INVENTION

Overview

Some examples of the invention relate to a network device management tool that provides information in response to requests from a client service, such as a network management tool or device setup utility, hosted another computing device a. Still other examples of the invention will alternately or additionally receive information from a client service hosted on another computing device. This received information may include, for example, instructions or data for configuring the network device hosting the network device management tool.

As will be appreciated by those of ordinary skill in the art, some examples of the invention may be implemented by preconfigured analog or digital circuitry. More typically, however, examples of the invention may be implemented by a programmable computing device executing software instructions. In particular, various examples of the invention may be embodied by modules implemented by a programmable computing device executing software instructions for exchanging information according to a communication protocol such as, e.g., the Simple Object Access Protocol (SOAP). The computing device may be any type of computer or computing appliance that is incorporated in a network device. For example, as will be discussed in more detail below, various examples of the invention may be implemented as a component of a computer, a router (also known as a gateway or residential gateway), digital photo hardware, a video camera, a media adapter, or a printer.

Network Environment

Figure 1:
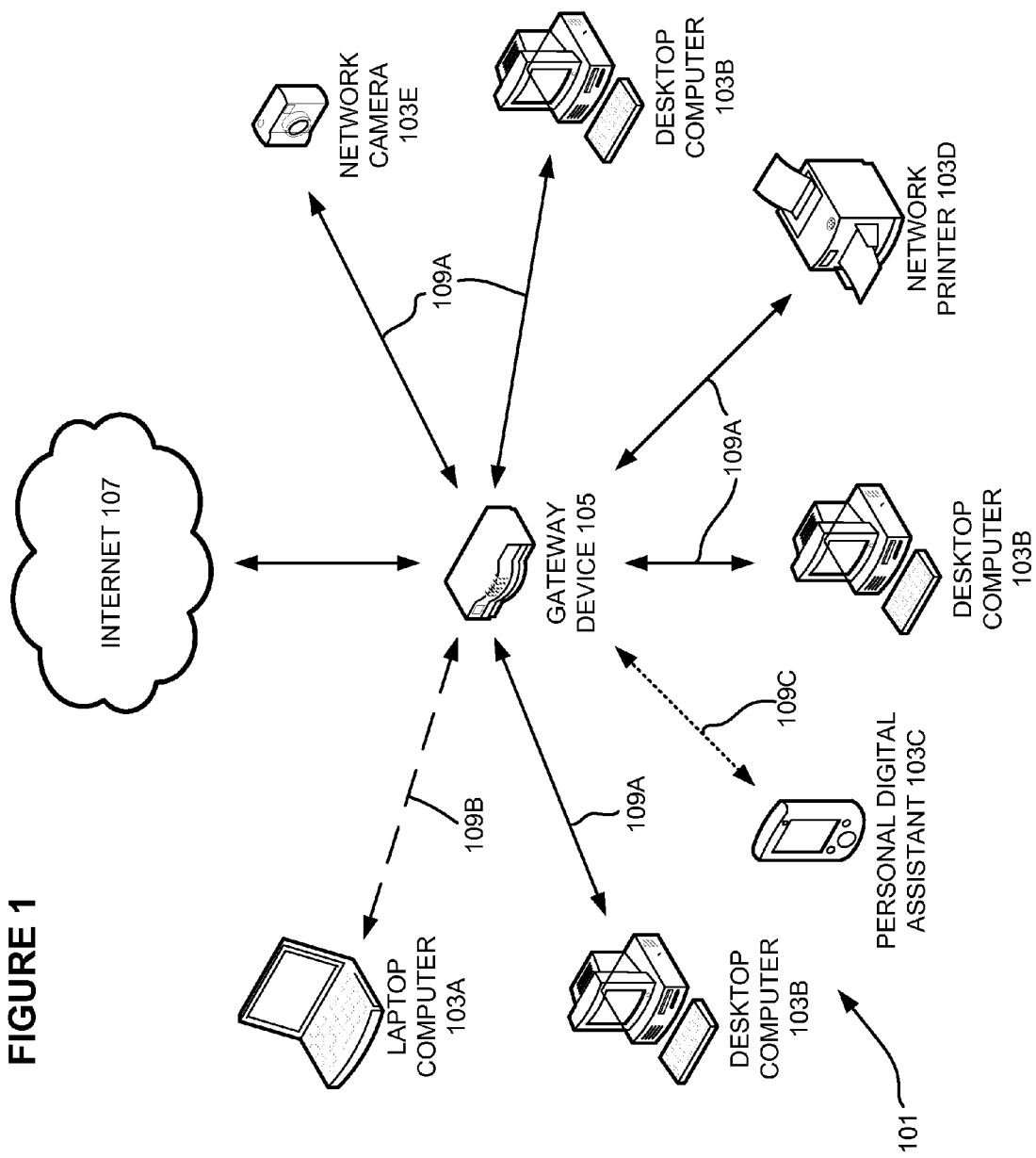
FIG. 1 illustrates an example of a network in which a network device management tool according to various examples of the invention may be employed.

As previously noted, various examples of the invention may be employed within a small network. FIG. 1 illustrates an example of this type of small network. The network 101 may include a variety of different computing devices or "nodes". For example, the network 101 may include one or more multipurpose computers 103, such as laptop computer 103A, desktop computers 103B, and personal digital assistant 103C. In addition to these computers, the network 101 may also include one or more computing appliances, which typically are not as versatile as conventional multipurpose computers, but which nonetheless may be configured to exchange data over a network. Such computing appliances may include, for example, network printers 103D, cameras 103E, and other special-purpose computing devices, such as telephones that exchange voice information in data packets (sometimes generically referred to as "Voice over Internet Protocol (VoIP) telephones"), digital video recorders, televisions, media adapters, media players, and digital music servers, among others.

The network appliances in the network 101 will typically include a gateway device 105, through which each of the networked devices 103 communicates, either directly or indirectly. In turn, the gateway device 105 typically will communicate with one or more devices outside of the network 101. For example, the gateway device 105 may communicate with another private network, a public network, such as the Internet 107, or both. Thus, the gateway device 105 is a device that can direct electronic data from one network to another network. Typically, the gateway device 105 serves as a common node on two different networks (e.g., networks that use different communication protocol formats), and, where necessary, it will convert data from one network's communication protocol format into the other network's communication protocol format. As used herein, the term "small network" refers to a network made up of networked devices 103 that each employ the same network address to communicate with a single gateway device 105, together with the gateway device 105 itself.

The network devices 103 may be connected to the gateway device 105 using any suitable communication medium. For example, in the illustrated network 101, the desktop computers 103B are connected to the gateway device 105 through a hard-wired connection 109A (such as an Ethernet cable), while the laptop computer 109B is connected to the gateway device 105 through a IEEE 802.11 wireless connection and the personal digital assistant 103C is connected to the gateway device 105 through a Bluetooth wireless connection.

It should be appreciated that, as used throughout this application, the term "connect" and its derivatives (e.g., connection, connected, connects) include both direct and indirect connections. Thus, with the network illustrated in FIG. 1, the laptop computer 103A may be connected to the gateway device 105 using a wireless transceiver incorporated into the laptop computer 103A and a wireless transceiver incorporated into the gateway device 105. Alternately, the laptop computer 103A may be connected to the gateway device 105 using a wireless transceiver external to the laptop computer 103, the gateway device 105, or both.

Typically, the gateway device 105 will be a router. As will be appreciated by those of ordinary skill in the art, a router routes data packets from the networked devices 103 to one or more device outside of the network 101, and vice versa. With some networks, however, the gateway device 105 alternately may be a computer performing router functions, a hub, a bridge, or a "layer-3" switch. As will also be appreciated by those of ordinary skill in the art, the computing devices or "nodes" making up the network 101 will communicate with the gateway device 105 using one or more defined communication protocols, such as the Transmission Control Protocol (TCP) and the Internet Protocol (IP).

With these communication protocols, each computing device 103 and gateway device 105 in the network 101 will be assigned a logical address. For example, if the network 101 is connected to the Internet 107 through an Internet service provider, the Internet service provider will assign the gateway device 105 a logical Internet Protocol (IP) address. The Internet service provider may also provide the gateway device 105 with a block of logical Internet Protocol (IP) addresses for the gateway device 105 to reassign to each network device 103. Alternatively, the gateway device 105 can itself assign a range of logical Internet Protocol (IP) addresses to each network device 103, and then use a translation operation (e.g., a Network Address Translation (NAT) operation) to route data packets that it receives to the appropriate network device 103. This type of logical address typically is unrelated to the particular computing device to which it is assigned. Instead, a logical address identifies the relationship of that computing device to other computing devices in the network.

In addition to a logical address, each network device typically also will have a physical address. For example, most computing devices capable of communicating over a network, including routers, employ a network adapter with a media access control (MAC) address. This type of physical address is assigned to a network interface of a computing device, referred to as a "network adapter," according to standards set forth by the Institute of Electrical and Electronic Engineers (IEEE) (referred to as "Project 802" or simply "802" standards, which are incorporated entirely herein by reference). More particularly, these standards define a 48-bit and 64-bit physical address format for network devices. The first 14 bits of the address are assigned by the IEEE Registration Authority, and uniquely identify the manufacturer of the network adapter. The remaining bits are then assigned by the manufacturer to uniquely identify each network adapter produced by the manufacturer. Consequently, the physical address of a network adapter is unique across all networks unless manually changed by the user. The physical address is unique to the network adapter, and is independent of a computing device's relationship to other computing devices in a network. Thus, the physical address does not change over time or between uses in different networks.

Network Devices

A network may include both virtual devices and physical devices. Physical network devices will then incorporate a computer, a computing appliance, or both. As previously noted, a "computer" may generally be characterized as a multipurpose device that can be programmed to perform a number of different, unrelated functions. Examples of computers will thus include personal computers, such as desktop computers and laptop computers. In addition, programmable media-purposed computers (e.g., "media adapters and servers"), network-attached storage devices, programmable entertainment-purposed computers (e.g., video game consoles), some programmable personal digital assistants and some telephones (such as wireless "smart" telephones) may be characterized as computers in a network. A "computing appliance" then may generally be characterized as a device that is limited to primarily performing only specific functions. Examples of a computing appliances may thus include, for example, printers, cameras, telephones that exchange voice information in data packets (sometimes generically referred to as "Voice over Internet Protocol (VoIP) telephones or telephone adapters), digital video recorders, televisions, voice over Internet protocol (VoIP) adapters, print servers, media adapters, media servers, photo frames, data storage servers, routers, bridges and wireless access points.

As will be appreciated by those of ordinary skill in the art, however, there may be no clear defining line between whether a network device is a "computer" or a "computing appliance." For example, a sophisticated print server may be programmed to additionally or alternately function as a data storage server, while a programmable media-purposed computer or programmable personal digital assistant may have restricted functionality due to limited memory, its input devices, or its output devices. Accordingly, the term "computing device" is used herein to include both computers and computing appliances.

With conventional networks located in a home, small office, or other local environment, a network management tool that may be used in conjunction with various embodiments of the invention may be implemented on a programmable personal computer, such as a desktop or laptop computer. Similarly, a network device management tool according to various examples of the invention may be implemented on a computer. A general description of these types of computing devices will therefore now be described.

Figure 2:
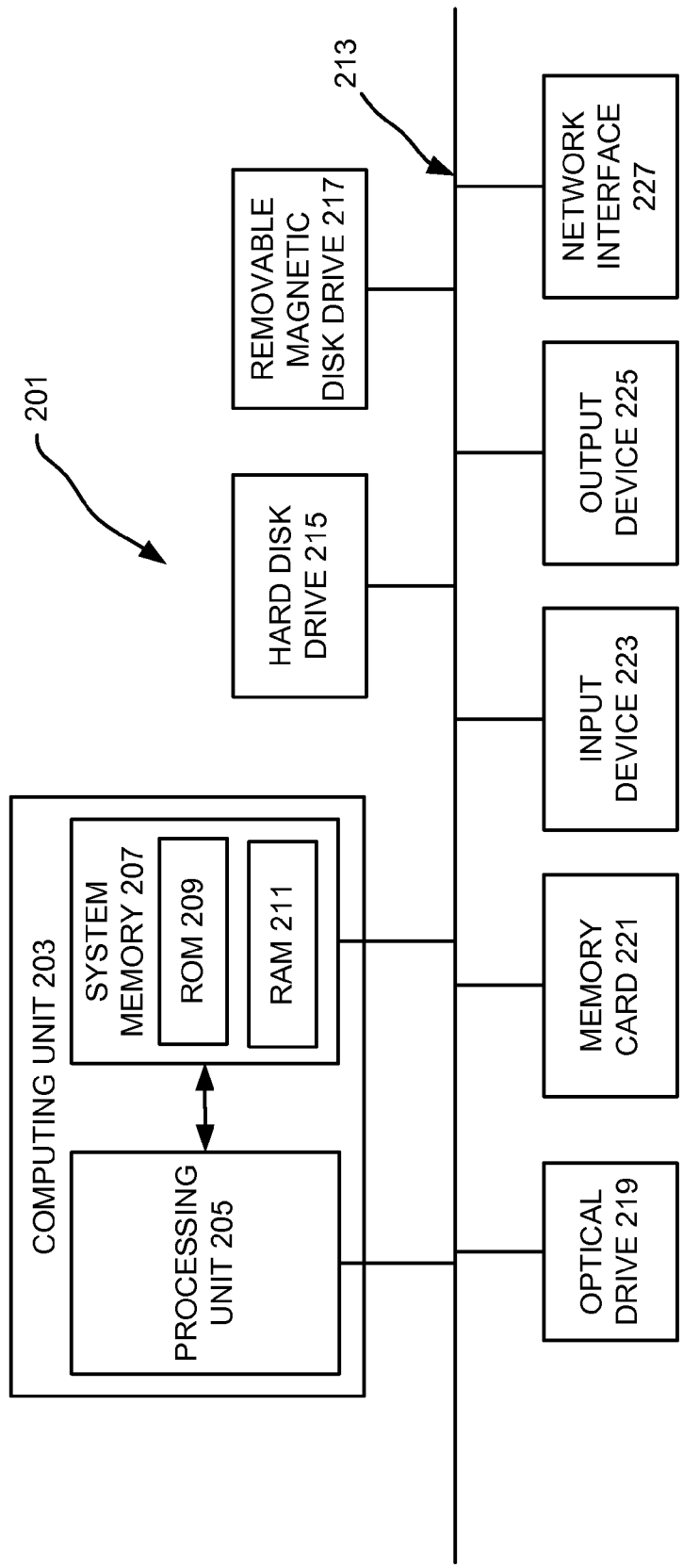
FIG. 2 illustrates an example of a computer that may be used to implement a network device management tool according to various examples of the invention.

An illustrative example of such a computer 201 is illustrated in FIG. 2. As seen in this figure, the computer 201 has a computing unit 203. The computing unit 203 typically includes a processing unit 105 and a system memory 207. The processing unit 105 may be any type of processing device for executing software instructions, but will conventionally be a microprocessor device. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure to one or more peripheral devices. For example, the processing unit 205 or the system memory 207 may be directly or indirectly connected to additional memory storage, such as the hard disk drive 215, the removable magnetic disk drive 217, the optical disk drive 219, and the flash memory card 221. The processing unit 205 and the system memory 207 also may be directly or indirectly connected to one or more input devices 223 and one or more output devices 225. The input devices 223 may include, for example, a keyboard, touch screen, a remote control pad, a pointing device (such as a mouse, touchpad, stylus, trackball, or joystick), a scanner, a camera or a microphone. The output devices 225 may include, for example, a monitor display, television, printer, stereo, or speakers.

Still further, the computing unit 203 will be directly or indirectly connected to one or more network interfaces 227 for communicating with a network. This type of network interface 227, also sometimes referred to as a network adapter or network interface card (NIC), translates data and control signals from the computing unit 203 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 227 may employ any suitable connection agent for connecting to a network, including, for example, a wireless transceiver, a power line adapter, a modem, or an Ethernet connection.

It should be appreciated that one or more of these peripheral devices may be housed with the computing unit 203 and bus 213. Alternately or additionally, one or more of these peripheral devices may be housed separately from the computing unit 203 and bus 213, and then connected (either directly or indirectly) to the bus 213. Also, it should be appreciated that both computers and computing appliances may include any of the components illustrated in FIG. 2, may include only a subset of the components illustrated in FIG. 2, or may include an alternate combination of components, including some components that are not shown in FIG. 2.

It also should be noted that, while a general description of a programmable personal computer was provided above, various embodiments of the invention may be implemented on any desired device capable of supporting the invention. For example, with some embodiments of the invention, the network management tool may be implemented on special-purposed programmable computers, such as a programmable media or entertainment-purposed computers, or personal digital assistants. Accordingly, the above description of a programmable personal computer should be understood as illustrative rather than limiting.

A computing appliance may have any combination of the components of the computer 201 discussed above. More typically, however, a computing appliance will be simpler to optimize the performance of a specific function, and thus may have only a subset of these components. For example, a computing appliance may have only a computing unit 203, an input device 223 or an output device 225, and a network interface 227. As will be apparent from the following description, however, a computing appliance will have sufficient computing resources to implement a desired embodiment of the invention in order to provide information to or receive information from a client operating on a separate computing device.

Network Management Tool

As previously discussed, various examples of the invention may be particularly beneficial for use with a network management tool for managing a small network. Accordingly, the operation of an example of such a tool, the NETWORK MAGIC software application available from Pure Networks of Seattle, Wash., will briefly be described to provide a better appreciation of the operation of various embodiments of the invention. As also previously discussed, the NETWORK MAGIC network management tool allows a user to monitor the status of devices on an electronic network, such as a network employing the Ethernet protocol, located in a home or small business. The NETWORK MAGIC network management tool may also allow a user to administer various tasks associated with the network, services in the network, or devices in the network.

Figure 3:
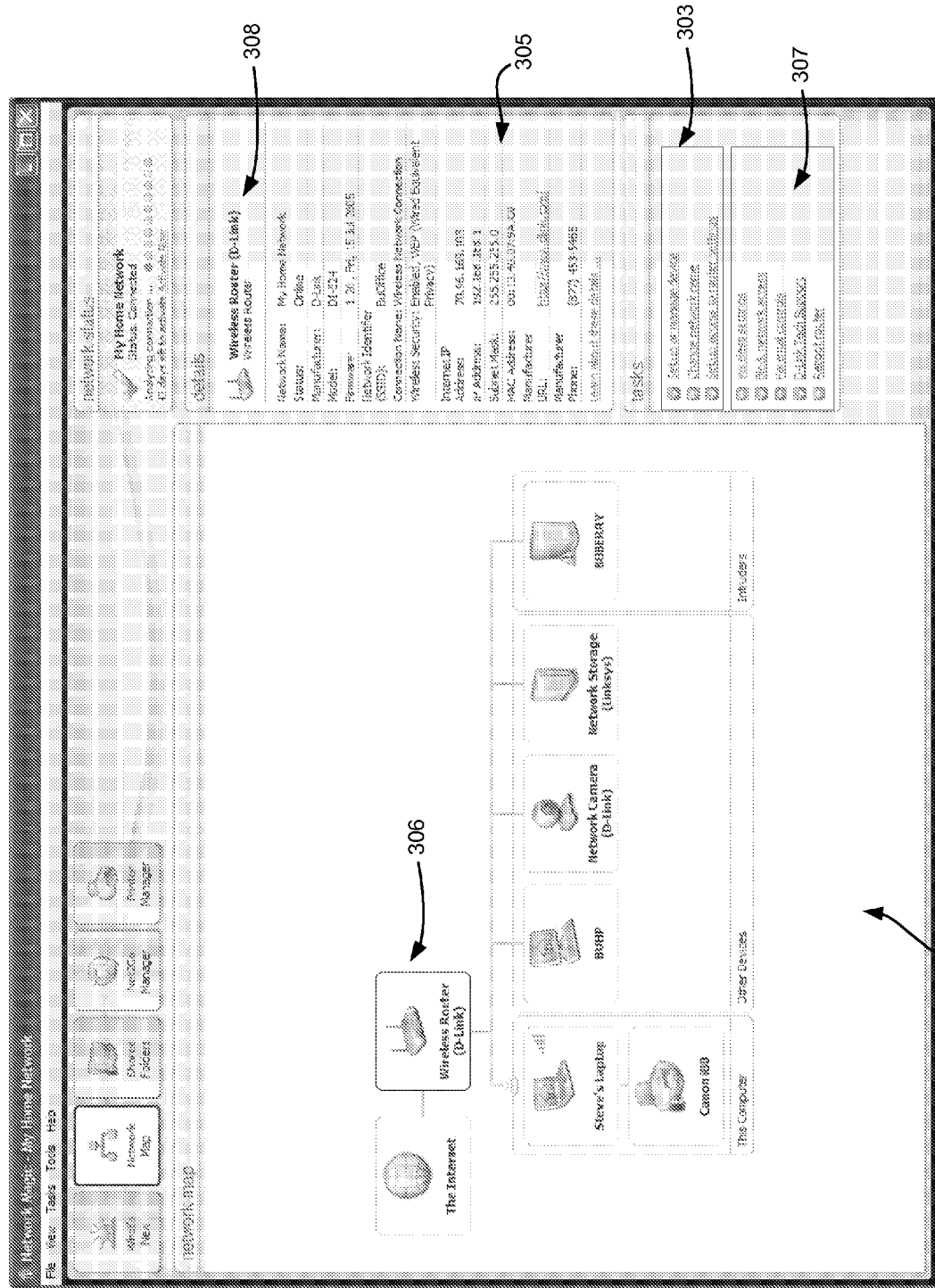
FIGS. 3-5 illustrate user interfaces that may be provided by a network management tool that may communicate with a network device management tool according to various examples of the invention.

FIG. 3 illustrates an example of a network map 301 generated by the NETWORK MAGIC network management tool to assist a user in managing a small network (commonly referred to as a local area network or LAN). The network map 301 provides end users with a visual interface that allows the end user to check and troubleshoot a small network's status, including the network connections in the local area network, the Internet connection provided by the Internet service provider (ISP), and which computers and devices are currently connected to the local area network. For each computer or device in the map, users can review information for that network device detected by the NETWORK MAGIC network management tool. For example, with regard to a computer connected to the network, the network map 301 may indicate the version of Microsoft Windows running on the computer, the computer's processor, the IP address it is using, etc.

Figure 4:
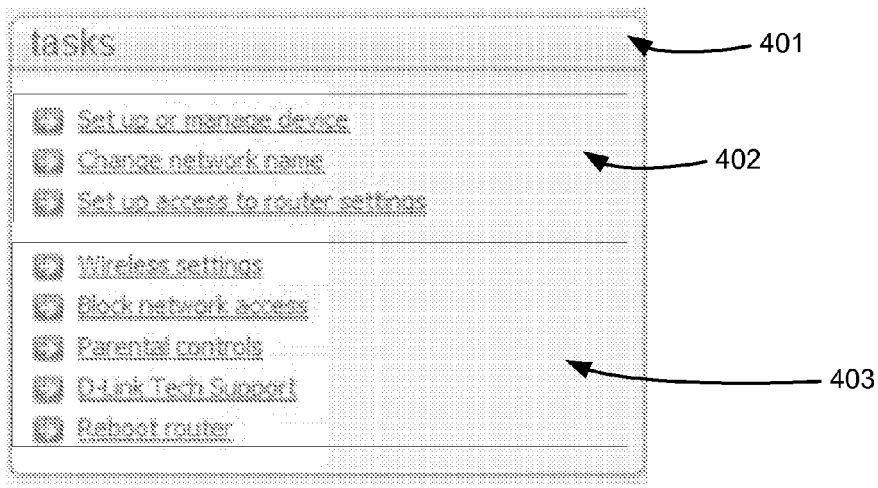

As seen in FIG. 3, the network map 301 provides a task interface 303, shown in greater detail in FIG. 4. The tasks interface 303 provides a convenient interface to allow a user to improve the operation of a small network, perform routine maintenance, set up or manage settings on a device, or use various features available from the NETWORK MAGIC network management tool. The command options presented by the task interface 303 will differ, based on the network device selected in the network map 301. For example, there may be task interfaces, specific to a computer, which are different from task interfaces specific to a router. Optionally, as will be discussed in more detail below, the NETWORK MAGIC network management tool may allow a network device management tool according to various examples of the invention, hosted on a network device, to provide additional tasks 307 that are relevant to that network device. The NETWORK MAGIC network magic tool, may, for example, request a list of additional tasks from a network device management tool, and then add those additional tasks to list of default tasks available for the network device hosting the network device management tool. Thus, by hosting a network device management tool on a network device, the manufacturer of the network device can extend the usefulness of the NETWORK MAGIC network management tool.

Figure 5:
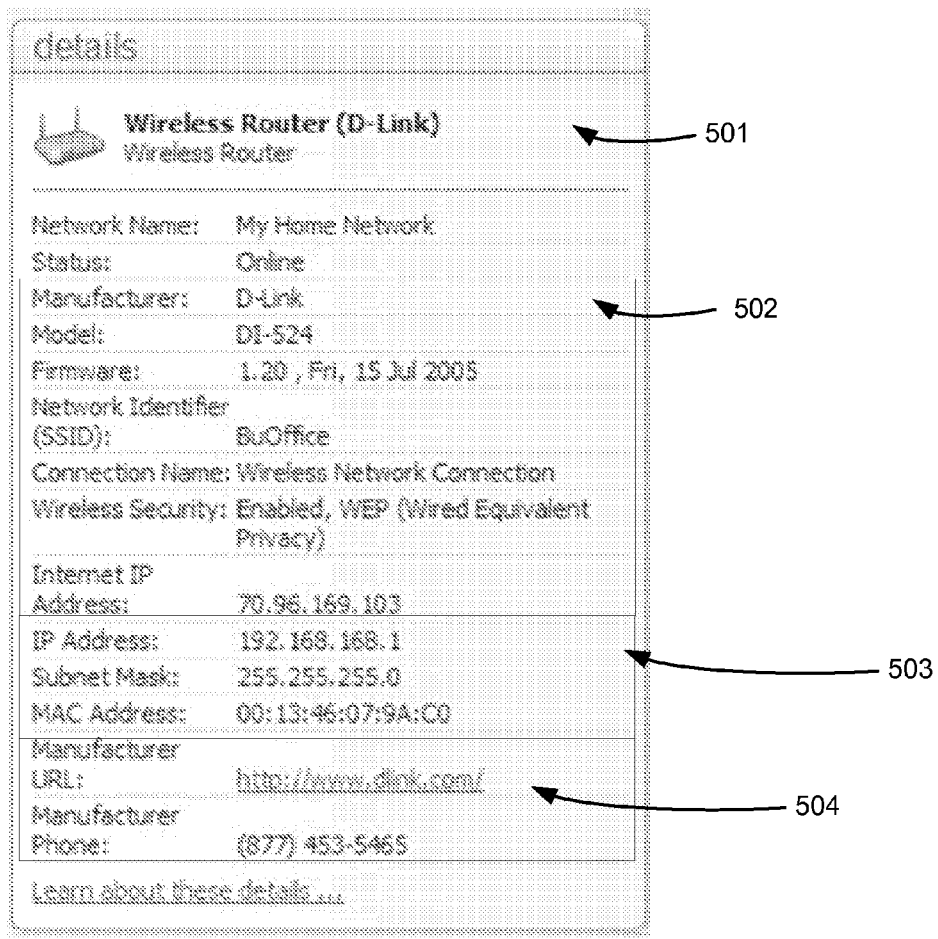

As also seen in FIG. 3, the network map 301 further provides a details interface 305, shown in greater detail in FIG. 5. When a user selects a device in the network map 301, the details interface 305 may display status information and settings about the selected device. By reviewing these details, a user can determine whether a device is online and available for use, as well as the features and capabilities of the device. Also, a user may view who manufactured the network device and how to contact the manufacturer. Again, the details will vary depending upon the type of selected device. For example, the details interface 305 will present different information depending upon whether the selected device is a router or a media adapter. The details interface 305 will typically include, however, the manufacturer and model name, IP address, MAC address, firmware version, and support site URL.

Network Device Configuration Tool

As previously discussed, various examples of the invention also may be particularly useful to a network device setup utility or other configuration tool. Accordingly, the operation of an example of one such tool, a router setup utility, will be briefly described to provide a better appreciation of the operation of various examples of the invention. It should be noted that various examples of this type of router setup utility are discussed in more detail in a U.S. patent application entitled "Network Device Setup Utility," naming Brett Marl et al. as inventors and being filed concurrently with the instant patent application, which concurrently filed patent application is incorporated entirely herein by reference.

The router setup utility assists a user in configuring a network router for use on a small network. More particularly, the router setup utility assists a user with the process of correctly connecting the network cables, configuring the router with the settings appropriate to the desired network arrangement, and validating that the router can successfully connect to the Internet. In some instances, the router setup utility may be capable of configuring any router that hosts an implementation of a network device management tool according to various embodiments of the invention. Thus, by incorporating a network device management tool according to various examples of the invention into their devices, router manufacturers may avoid the need to develop a custom device configuration tool for every router they produce.

Figure 6:
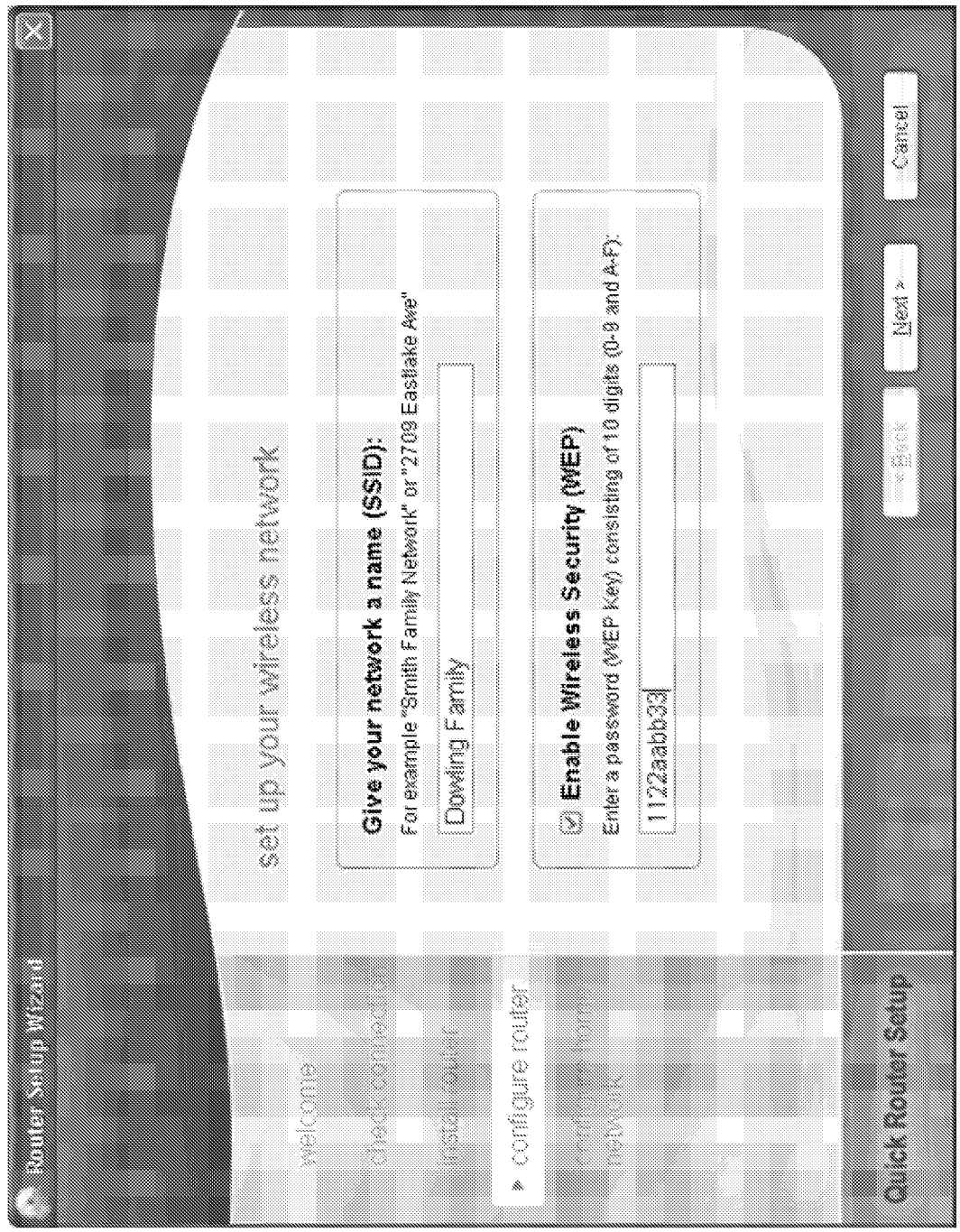
FIG. 6 illustrates a network configuration user interface that may be provided by a device setup utility that may communicate with a network device management tool according to various examples of the invention.

For example, the router setup utility may communicate with a network device management tool hosted on a router, in order to retrieve or designate settings of the router. The router setup utility may then assist a user in configuring the router for network access. For example, FIG. 6 illustrates a network configuration user interface that may be provided by an example of a router setup utility to prompt a user for the name of the network that will be maintained by the router (i.e., by establishing a wireless Service Set IDentifier (SSID) for the router), optionally enable Wireless Security (WEP) for the router's operations, and, if appropriate, enter a WEP password. The router setup utility then validates the information entered by the user, and communicates the user's setting selections to the network device management tool hosted on the router. As will be discussed in detail below, a network device management tool according to one or more embodiments of the invention can then implement the setting selections provided by the router setup tool.

It should be appreciated that, while a router setup utility specifically has been discussed above, various examples of the invention may implement a network device management tool capable of cooperating with a device setup tool for any desired type of network device. Accordingly, a manufacturer of a network device need not provide a special-purpose configuration tool to allow a user to properly configure its device. Rather, the manufacturer can employ an implementation of the network device management tool according to an example of the invention that is capable of receiving and implementing instructions received from a setup tool generic to network devices of its type.

Overview of a Network Device Management Tool

As will be discussed in further detail below, a network device management tool according to various examples of invention may be implemented using the Simple Object Access Protocol (SOAP) version 1.1, a lightweight, Extensible Markup Language (XML)-based messaging protocol. As will be appreciated by those of ordinary skill in the art, this protocol allows the network device management tool to work with readily-available tools, including Microsoft Visual Studio.NET, Apache, PHP, JSP, and the like. The Simple Object Access Protocol (SOAP) is incorporated entirely herein by reference. Of course, still other examples of the invention may employ any desired alternate messaging protocol, such as a Representational State Transfer (REST) protocol or the Remote Procedure Call (RPC) protocol, documented in RFC 1831, which is incorporated entirely herein by reference.

Figure 7:
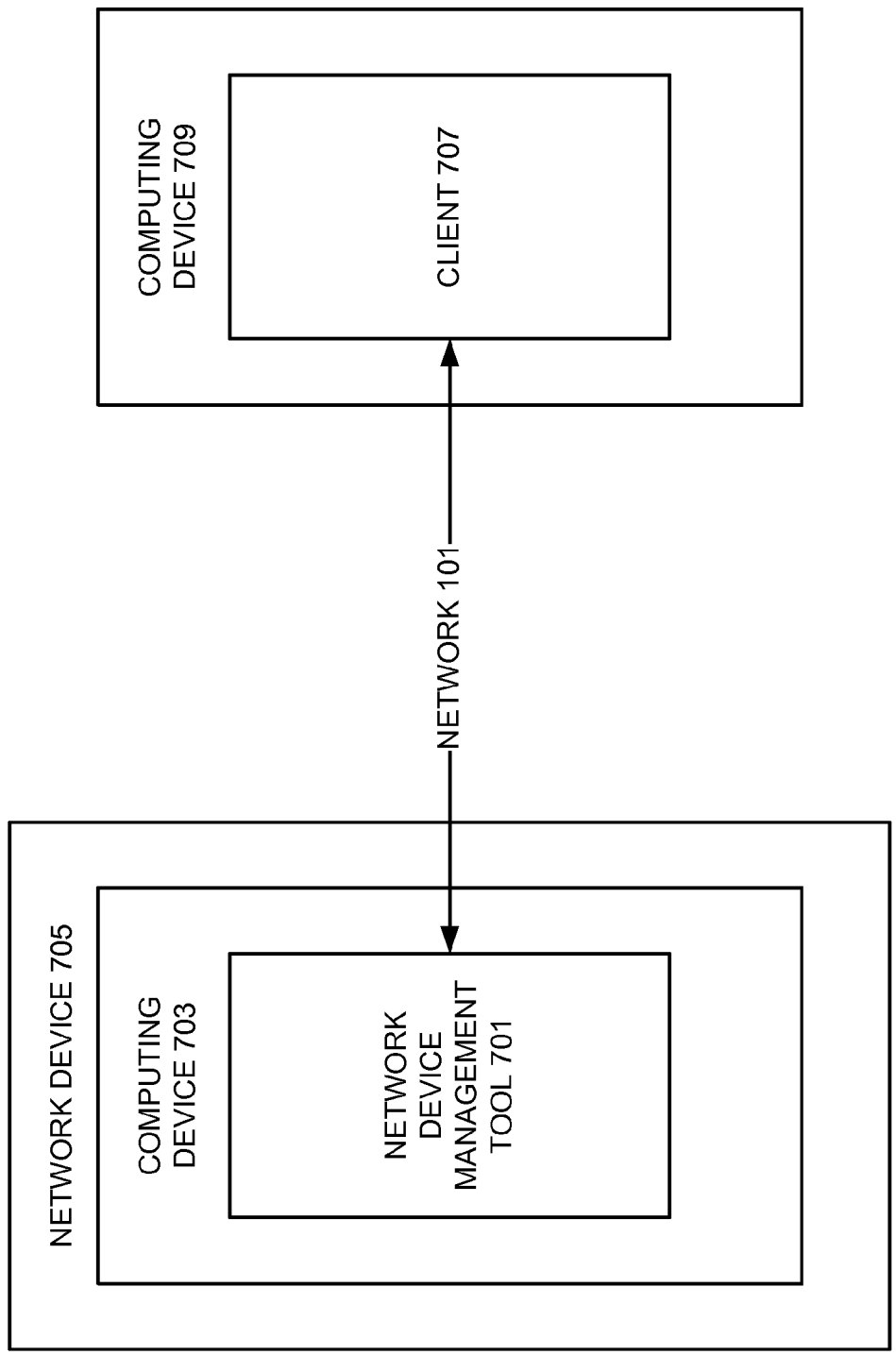
FIG. 7 illustrates a relationship between a client and a network device hosting a network device management tool according to various examples of the invention.

FIG. 7 illustrates the implementation of a network device management tool 701 according to various examples of the invention. As seen in this figure, the network device management tool 701 may be implemented by a computing device 703 incorporated into (or otherwise associated with) a network device 705. With various examples of the invention, the computing device 703 may be a network appliance. The computing device 703 controls or otherwise assists in the control of the operation of the network device 705. Accordingly, memory for the computing device 703 (such as a system memory 207) will include data for settings associated with the network device, such as, for example, setting values used by the network device during operation and/or setting values that describe permanent or semi-permanent features or characteristics of the network device.

As will be discussed in more detail below, the network device management tool 701 can access these setting values. More particularly, the network device management tool 701 can retrieve data from memory employed by the computing device 703, such as settings associated with the network device. With various embodiments of the invention, the network device management tool 701 may alternately or additionally add new data to the memory employed by the computing device 703, or change the values of existing data in the memory. Thus, the network device management tool 701 may add or change setting values associated with the network device 705. Still further, the network device management tool 701 may implement instructions to have the computing device 703 control the network device 705 to perform one or more operations.

The network device 705 in turn communicates, through a network 101, with a client 707 hosted by another computing device 709. As previously noted, the client 707 may be a network management tool, a network device setup tool, or any other desired operational component that may need to retrieve information from or send information to the network device 705.

Figure 8:
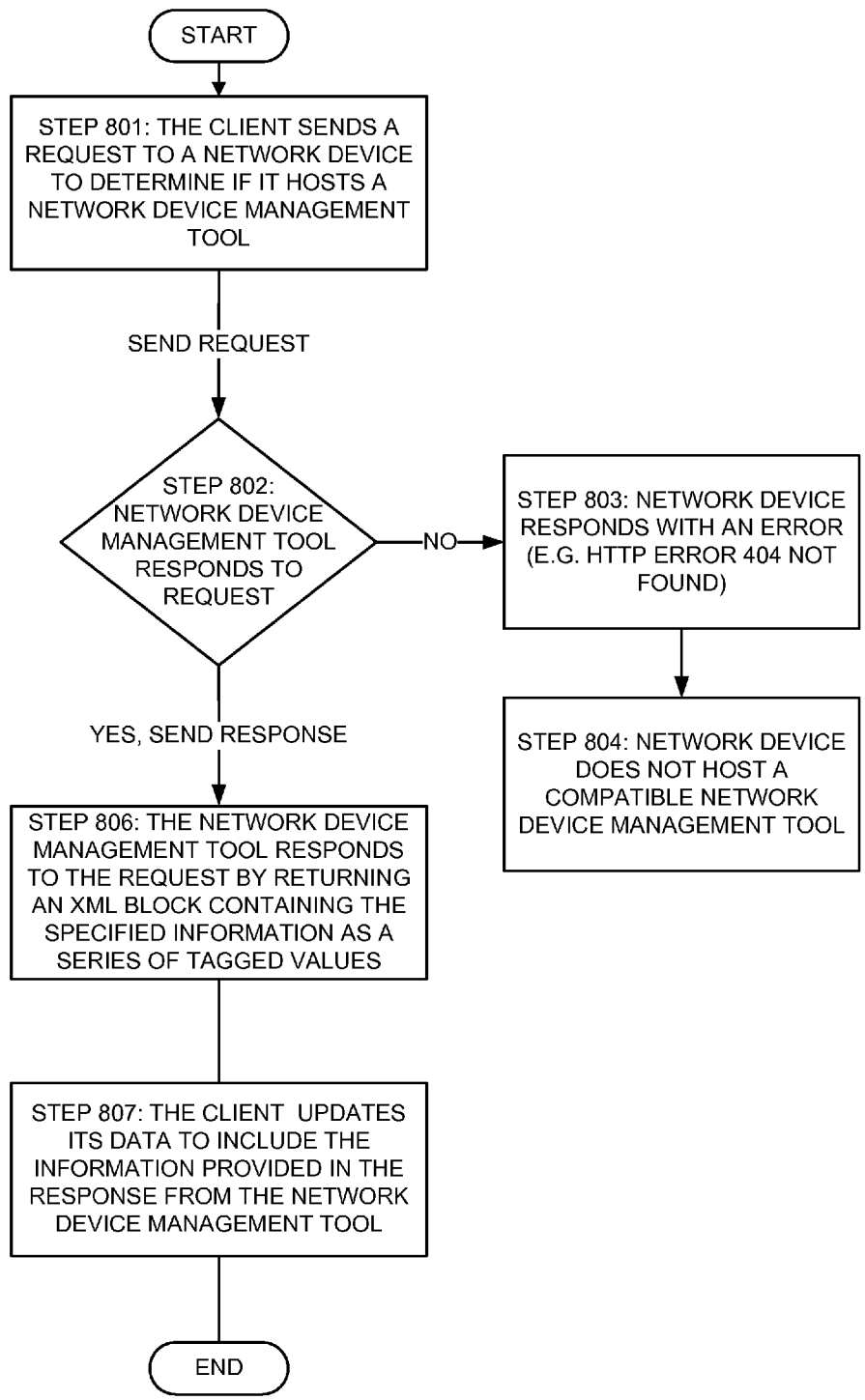
FIGS. 8 and 9 illustrate flowcharts showing the operation of a network device management tool according to various examples of the invention.

The operation of the network device management tool 701 will now be described with reference to FIG. 8. Initially, in step 801, the client 707 sends a request for information to the network device 705 to determine if the network device hosts a network device management tool 701 according to an embodiment of the invention. As will be appreciated by those of ordinary skill in the art, however, not all network devices may host a network device management tool 701 according to an embodiment of the invention, and not all network devices that host a Web server understand how to interpret a SOAP request. Further, the proper credentials to communicate with the network device may not be available until the device is known to the network management tool. Thus, in practice, some network devices malfunction when sent an unsupported SOAP request.

Accordingly, with some implementations of the invention, the client 707 may not use an authenticated SOAP action to make the initial request to discover if the network device 705 hosts a network device management tool 701. Instead, the client 707 may use a HTTP GET request without authentication to a pre-established URL. Therefore, the detection phase of whether or not a network device hosts a network device management tool 701 may use a standard HTTP GET request which all network devices should be able to handle properly. As will be described in further detail below, all non-detection requests to the network device management tool 701 then use the SOAP protocol.

More particularly, with various examples of the invention, the initial request is an HTTP GET to a web server hosted on the network device that may use, for example the following URL: http://<device_IP>/HNAP1/(e.g. http://192.168.1.1/HNAP1/). If the network device does not host a network device management tool (see step 802), the network device will fail to respond to the request, or respond with a "file not found" type error condition (see step 803). Upon failure, the client 707 will assume the network device does not host a network device management tool 701 (see step 804). If the network device 705 hosts a network device management tool 701 according to various embodiments of the invention (see step 802), the network device management tool 701 will respond with the results of the request (see step 806). More particularly, with various examples of the invention, the HTML response will provide the same results that are provided by a method call to GetDeviceSettings, which will be discussed in more detail below.

Figure 9:
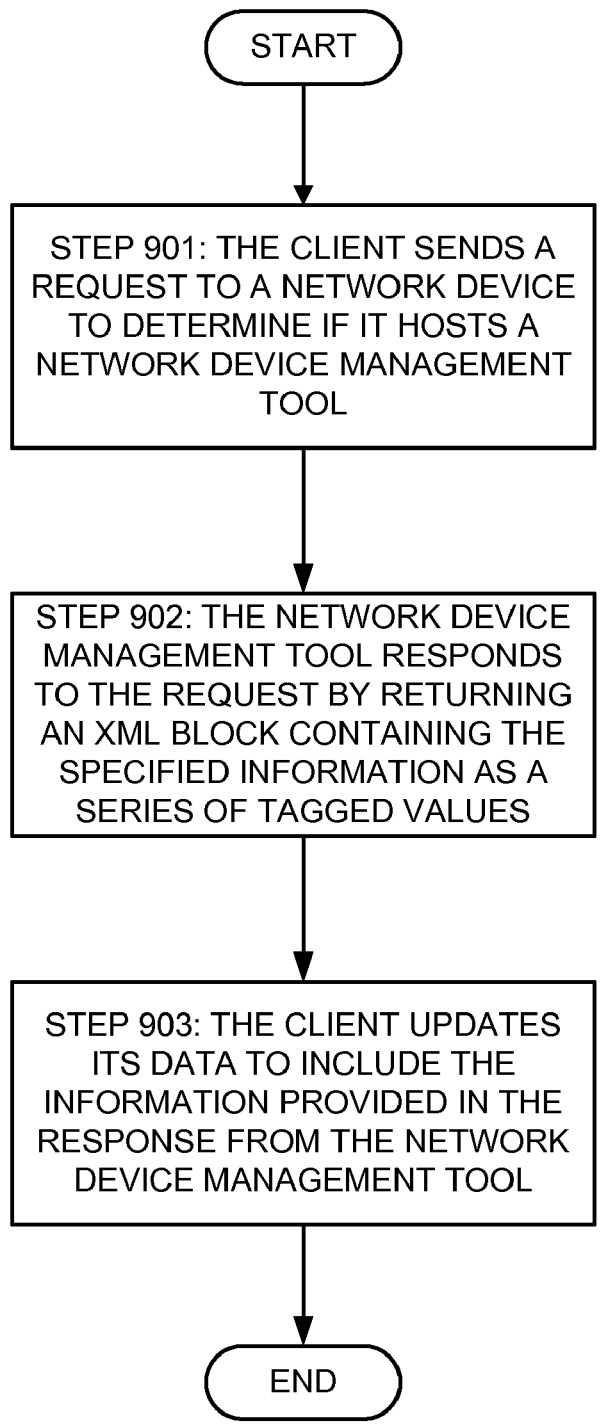

For all subsequent, non-detection requests, as shown in FIG. 9, in step 901 the client 707 sends an authenticated request to the network device 705 to request information or to perform an operation on the network device (e.g., changing a device setting). More particularly, with various examples of the invention, all non-detection requests to the network device management tool 701 may be in the form of an HTTP POST to a Web server hosted on the network device 705 using, for example, a URL with a format of the following type: http://<device_IP>/HNAP1/(e.g. http://192.168.1.1/HNAP1/). The message header contains a SOAPAction: field which defines the particular request. The network device management tool 701 then uses HTTP basic authentication, provided by the "authentication" HTTP header as specified in RFC 1945, to authenticate the request. The message body will be an XML block containing the data for that request. It should be noted that, if a specific implementation requires the client 707 be hosted on a different port or virtual location, the initial request can be redirected with a HTTP 302 response to another location including a different port (e.g., http://<device-IP>:8080/HNAP1/).

If the network device hosts a network device management tool 701, it processes the request. More particularly, in step 902, the network device management tool 701 responds to the request by returning an XML block to the client 707 containing the specified information as a series of tagged values. In step 903, the client 707 updates its data to include the information provided in the response from the network device management tool 701. With various implementations, the client 707 may maintain its data in an XML file. This arrangement allows the client 707 to easily assimilate the information provided in an XML block by the network device management tool 701.

Each request recognized by the network device management tool 701 can be independent and stateless. A network device 705 may thus support multiple requests from different IP addresses on the local network 101, as different instantiations of a client 707 may be simultaneously running on multiple computers in the network 101. Further, each request from a client 707 may further be atomic. Because some communications between the client 707 and the network device management tool 701 may use a get/set pattern of commands, it is possible to lose settings that were made by a different client 707 in between a get and a set instruction. This may be avoided by coordination of operations between multiple clients 707.

Discussing the operation of the network device management tool 701 in more detail, the client 707 issues an authenticated POST on <device_ip>/HNAP1/, as previously noted. This POST may have the following syntax:

```
C: POST /HNAP1/ HTTP/1.1
Accept: text/xml
SOAPAction: "http://purenetworks.com/HNAP1/[method_name]"
Content-Type: text/xml; charset=utf-8
Authorization: Basic YWRtaW46
User-Agent: Mozilla/4.0 (compatible; MSIE 5.5; Win32)
Host: 192.168.0.1
Content-Length: 420
<?xml version="1.0" encoding="utf-8"?>
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/"
    soap:encodingStyle="http://schemas.xmlsoap.org/soap/encoding/">
    <soap:Body>
        [method_specific_body]
    </soap:Body>
</soap:Envelope>
``` where the [method_name] and [method_specific_body] are replaced with the specific method call. A method call may be a request to obtain information (e.g. a method call such as GetDeviceSettings, which will be discussed in more detail below) or an instruction to employ specified information (e.g., a method call such as SetWanSettings, which also will be discussed in more detail below). The SOAPAction HTTP header defines the specific method call, while the XML fragment enclosed in the <soap:Body> tags contains the specific parameters for that method.

The network device management tool 701 implemented on the network device 705 then responds to requests on the URL /HNAP1/. The expected response from the device informs the client 707 that the device 705 supports requests and instructions from the network device management tool 701. If the network device processed the request, it returns an XML-encoded SOAP response specific to the request made. With various examples of the invention, the response may be in the following format:

```
HTTP/1.1 200 OK
Server: Embedded HTTP Server 1.01
Content-Type: text/xml
Content-Length: 1917
Connection: close
<?xml version="1.0" encoding="utf-8" ?>
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/">
    <soap:Body>
        [method_specific_response_body]
    </soap:Body>
</soap:Envelope>
``` where [method_specific_response_body] are replaced with the specific response XML fragment for the operation in question.

According to various examples of the invention, the network device management tool 701 will return a well formed SOAP response to all methods. Each SOAP response contains a method specific result tag (e.g., SetWanSettingsResult) that contains a string value of the results. Table 1 shows the possible values for this string that might be employed by various examples of the invention.

TABLE 1

| Value | Description |
| --- | --- |
| OK | The operation completed successfully. All the parameters were fine and all configuration changes were applied without requiring a reboot. |
| ERROR | The operation failed. No configuration changes were applied and the network device is in the same state as before the call. |
| REBOOT | The operation completed successfully. All the parameters were fine. The device will reboot to apply the changes. When the device reboots, it must make sure that it does not respond to IsDeviceReady as OK until the reboot completes. |

An example of a communication flow between a client 707 and a network device management tool 701 follows, where the client 707 is designated as the client by the C: line prefix, and the network device management tool 701 is designated as the server as indicated by the S: line prefix.

```
C: POST /HNAP1/ HTTP/1.1
C: Accept: text/xml
C: SOAPAction: "http://purenetworks.com/HNAP1/SetWanSettings"
C: Content-Type: text/xml; charset=utf-8
C: Authorization: Basic YWRtaW46
C: User-Agent: Mozilla/4.0 (compatible; MSIE 5.5; Win32)
C: Host: 192.168.0.1
C: Content-Length: 865
C: Connection: Keep-Alive
C: Cache-Control: no-cache
C: Pragma: no-cache
C:
C: <?xml version="1.0" encoding="utf-8"?>
C: <soap:Envelope
C:     xmlns:xsi="http://www.w3.org/2001/XMLSchema-instance"
C:     xmlns:xsd="http://www.w3.org/2001/XMLSchema"
C:     xmlns:soap="http://schemas.xmlsoap.org/soap/envelope/"
```

-continued

```
C:    soap:encodingStyle="http://schemas.xmlsoap.org/soap/encoding/">
C: <soap:Body>
C:      <SetWanSettings xmlns="http://purenetworks.com/HNAP1/">
C:          <Type>DHCP</Type>
C:          <Username></Username>
C:          <Password></Password>
C:          <MaxIdleTime>0</MaxIdleTime>
C:          <MTU>1500</MTU>
C:          <ServiceName></ServiceName>
C:          <AutoReconnect>false</AutoReconnect>
C:          <IPAddress></IPAddress>
C:          <SubnetMask></SubnetMask>
C:          <Gateway></Gateway>
C:          <DNS>
C:              <Primary></Primary>
C:              <Secondary></Secondary>
C:          </DNS>
C:          <MacAddress>00:15:E9:6A:22:63</MacAddress>
C:      </SetWanSettings>
C:  </soap:Body>
C: </soap:Envelope>
S: HTTP/1.1 200 OK
S: Server: Embedded HTTP Server 1.02
S: Content-Type: text/xml
S: Connection: close
S:
S: <?xml version="1.0" encoding="utf-8"?>
S: <soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
S:    <soap:Body>
S:        <SetWanSettingsResponse xmlns="http://purenetworks.com/
HNAP1/">
S:            <SetWanSettingsResult>REBOOT</SetWanSettingsResult>
S:        </SetWanSettingsResponse>
S:    </soap:Body>
S: </soap:Envelope>
```

As previously noted, the network device management tool 701 according to various examples of the invention also will provide requested information or change the specified data values used by the network device 705, such one or more operational values. For example, in response to a GetDeviceSettings request or "call" (which will be discussed in more detail below), the network device management tool 701 returns base information for its associated hardware device. Thus, any network device 705 returning a successful response to a GetDeviceSettings call will be accepted by the client 707 as a supported network device 705 implementing a network device management tool 701 according to an embodiment of the invention. Also, as will be discussed in more detail below, basic information for the device 705 may be described in the returned fields (for example, <Vendor Name> and <Model-Name>).

Similarly, in response to a SetWanSettings instruction or "call," the network device management tool 701 will change the data fields identified in the call to the field values specified in the call. With various examples of the invention, this type of instruction call will overwrite the current field values. More specifically, if a parameter is passed as a null string, it clears the field (rather than leaves the current contents). Table 2 shows an example of a SetWanSettings call to a router for setting the DHCP mode. In the DHCP mode, the router uses DHCP to request an IP address from the network connected to the WAN side of the router (typically from an Internet Service Provider (ISP) if the router is directly connected to the Internet). In response to this call, the network device management tool 701 will update the DNS entries of the router, clear the IPAddress and SubnetMask on the WAN side of the router, and request a new IP address from the network connected to WAN side of the router (which typically is from an ISP, as noted above).

```
<SetWanSettings xmlns="http://purenetworks.com/HNAP1/">
    <Type>DHCP</Type>
    <Username></Username>
    <Password></Password>
    <MaxIdleTime></MaxIdleTime>
    <ServiceName></ServiceName>
    <AutoReconnect>false</AutoReconnect>
    <IPAddress></IPAddress>
    <SubnetMask></SubnetMask>
    <Gateway></Gateway>
    <DNS>
        <Primary></Primary>
        <Secondary></Secondary>
    </DNS>
    <MacAddress>00:0e:44:45:fe:de</MacAddress>
    <MTU>1500</MTU>
</SetWanSettings>
```

With various examples of the invention, the client 707 can detect instantiation of the network device management tool 701 by, for example, sending a GetDeviceSettings POST to the URL "/HNAP1/". As noted above, however, this may cause some network devices, such as routers, to undesirably reboot. Accordingly, with various examples of the invention, the network device management tool 701 will support receiving a GET on a URL, such as the URL "/HNAP1/", with no authentication, and then respond with the exact same response as the GetDeviceSettings call. As discussed in detail above, client devices can use this type of GET request to more safely detect the use of a network device management tool 701 according to various implementations of the invention.

With some examples of the invention, the network device management tool 701 may obtain data from or set data into data fields that are specific to one or more supported devices. Thus, with some implementations of the invention, the network device management tool 701 may support one or more of the specific device types listed in Table 3, in addition to a "generic" device type that may be employed for any type of network device.

TABLE 3

Computer
ComputerServer
workstationComputer
LaptopComputer
Gateway
GatewayWithWiFi
DigitalDVR
DigitalJukebox
MediaAdapter
NetworkCamera
NetworkDevice
NetworkDrive
NetworkGameConsole
NetworkPDA
NetworkPrinter
NetworkPrintServer
PhotoFrame
VOIPDevice
WiFiAccessPoint Some configuration changes on a network device 705 can require the device hardware to reboot itself in order for the changes to take effect. When a device reboots, it can take considerable time (for example, from 15-60 seconds) to return to a normal operating status. Until the device 705 is in its normal operating state, its hosted network device management tool 701, will not processes any other requests. In some cases, a client 707 might choose to execute multiple configuration commands in sequence, in order to perform a batch operation. If one of these commands were to cause a reboot, the subsequent commands in the batch would fail to execute.

Accordingly, with various examples of the invention, the network device management tool 701 will communicate with the client 707 that its network device 705 will be unavailable for a period of time while it is rebooting. More particularly, if the network device 705 is going to need to reboot, the network device management tool 701 will respond to a message specifying a configuration change with a REBOOT result (instead of the OK or ERROR results noted above), and ensures that the HTTP response is completed before the reboot. When the network device 705 then reboots, the network device management tool 701 will ensure that it does not respond to the call IsDeviceReady with an OK result until the reboot or reboots are completed. The network management tool 607 may then enter a phase during which it periodically polls the network device management tool 701 (e.g., every second) to determine if the network device management tool 701 has returned to its normal operating status as indicated by an OK response to the IsDeviceReady call. With various examples of the invention, the network device management tool 701 will not respond to any HNAP/HTTP requests until any required reboots are finished.

With various examples of the invention, the network device management tool 701 may employ one or more structures for use in responding to calls to the network device management tool 701. For example, some embodiments of the invention may employ the following structures: the ConnectedClient structure, shown in Table 12; the DNSSettings structure, shown in Table 13; the PortMapping structure, shown in Table 14; the NetworkStats structure, shown in Table 15; the TaskExtension structure, shown in Table 15; and the MACInfo structure, shown in Table 16.

Each of these structures will be described with reference to Tables 12-15, respectively, in more detail below.

TABLE 12

The ConnectedClient Structure

```
<ConnectedClient>
    <ConnectTime>[date]</ConnectTime>
    <MacAddress>[string]</MacAddress>
    <DeviceName>[string]</DeviceName>
    <PortName>[string]</PortName>
    <Active>[boolean]</Active>
</ConnectedClient>
```

| Field Name | Description |
|---|---|
| ConnectTime | Either of the following, whichever showed up first: The last time the device connected. The first time the device showed up in DHCP or ARP table. This is the earliest time this specific device was not connected. Represented as an ASCII/ISO 8859-1 (Latin-1) entity. Example: 2005-05-31T17:23:18 |
| MacAddress | The MAC address in xx:xx:xx:xx:xx:xx hexadecimal form. |
| DeviceName | If known (usually through DHCP). |
| PortName | If it is a wired (Ethernet) LAN connection, this is the following: LAN If it is a wireless (Wi-Fi) LAN connection, this is one of the following: WLAN 802.11a WLAN 802.11b |

TABLE 12-continued

The ConnectedClient Structure

| | |
|---|---|
| | WLAN 802.11g Note If there are multiple ports, both get returned separately. Example 1: 802.11g and 802.11n are supersets of 802.11b, so the network device management tool 701 would return 802.11g or 802.11n instead of 802.11b. Example 2: It is possible to have both an 802.11a port and an 802.11g port. |
| Active | Whether this device is currently connected on the network: true or false Some devices might still be listed even if they are currently inaccessible. |

TABLE 13

The DNSSettings Structure

```
<DNS>
    <Primary>[string]</Primary>
    <Secondary>[string]</Secondary>
</DNS>
```

| Field | Description |
|---|---|
| Primary | IP address for the primary DNS, in x.x.x.x decimal form. |
| Secondary | IP address for the secondary DNS, in x.x.x.x decimal form. |

TABLE 14

The PortMapping Structure

```
<PortMapping>
    <PortMappingDescription>[boolean]</PortMappingDescription>
    <InternalClient>[string]</InternalClient>
    <PortMappingProtocol>[string]</PortMappingProtocol>
    <ExternalPort>[string]</ExternalPort>
    <InternalPort>[int]</InternalPort>
</PortMapping>
```

| Field | Description |
|---|---|
| PortMappingDescription | User friendly name for the port mapping. |
| InternalClient | Destination LAN based IP address where this port is mapped to. |
| PortMappingProtocol | Can be one of the following strings: TCP UDP To specific which port type is mapped. |
| ExternalPort | Port number on WAN side. |
| InternalPort | Port number on LAN side. |

TABLE 15

The NetworkStats Structure

```
<NetworkStats>
    <PortName></PortName>
    <PacketsReceived>[int]</PacketsReceived>
    <PacketsSent>[int]</PacketsSent>
    <BytesReceived>[int]</BytesReceived>
    <BytesSent>[int]</BytesSent>
</NetworkStats>
```

| Field | Description |
|---|---|
| PortName | If it is a wired (Ethernet) LAN connection, use the following: LAN |

TABLE 15-continued

The NetworkStats Structure

| | |
|---|---|
| | If it is a wireless (Wi-Fi) LAN connection, use one of the following:<br>WLAN 802.11a<br>WLAN 802.11b<br>WLAN 802.11g<br>Note<br>If there are multiple ports, both get returned separately.<br>Example 1: 802.11g and 802.11n are supersets of 802.11b, so the network device management tool 701 would return 802.11g or 802.11n instead of 802.11b.<br>Example 2: There may be both an 802.11a port and an 802.11g port. |
| PacketsReceived | Count of the packets received |
| PacketsSent | Count of the packets sent |
| BytesReceived | Count of the total bytes received |
| BytesSent | $ Count of the total bytes sent |

TABLE 16

The TaskExtension Structure

```
<TaskExtension>
    <Name>[string]</Name>
    <URL>[string]</URL>
    <Type>[string]</Type>
</TaskExtension>
```

| String | Description |
|---|---|
| Name | User friendly name for task to perform |
| URL | Url to open in browser or execute when user clicks on task |
| Type | Can be one of:<br>Silent: a request is sent to the router at the given URL and no further client actions are performed)<br>Browser: (a new browser window is launched with the specified URL),<br>MessageBox: a client message box is launched with the text/plain results returned from the given URL |

TABLE 17

The MACInfo Structure

```
<MACInfo>
    <Name>[string]</Name>
    <URL>[string]</URL>
    <Type>[string]</Type>
</ MACInfo >
```

| String | Description |
|---|---|
| Name | User friendly name for task to perform |
| MacAddress | MAC address of the client device in XX:XX:XX:XX:XX:XX format |
| DeviceName | If known (usually via DHCP). The text/plain results returned from the given URL |

The various call methods that were discussed above will now be described in more detail. It should be noted that any of these methods can be employed with any device type as specified above.

For each method described, a pseudo short-hand notation will be used for convenience and ease of understanding to describe the input and output parameters requires for each SOAP action. It should be noted that the short-hand notation is serialized as XML when used as part of the protocol. The pseudo notation is in the following format:

[return_type] [method_name] ([method_arguments])

Where [method_arguments] contains a comma separated list of parameters describing their name as serialized in XML and their type. Each parameter also has a direction modifier prefix—either "out" or "in." The presence of the "in" modifier indicates that the parameter is to be supplied as part of the request data. The presence of the "out" modifier on the parameter indicates that the parameter should be returned by the network device management tool 701 as part of a response. If the direction modifier is omitted, it should be assumed to be an "in" parameter.

For each method invocation, a request is formed in SOAP by the client 707 may take the following form:

```
<?xml version="1.0" encoding="utf-8"?>
<soap:Envelope>
    <soap:Body>
        <[method_name]>
            [inbound_method_arguments]
        </[method_name]>
    </soap:Body>
</soap:Envelope>
``` where [inbound_method_arguments] is an XML serialized list of inbound parameters from the method_arguments list.

Once the network device management tool 701 processes the request, it returns a response in the following form:

```
<?xml version="1.0" encoding="utf-8" ?>
<soap:Envelope>
<soap:Body>
<[method_name]Response>
    <[method_name]Result>OK</[method_name]Result>
    [outbound_method_arguments]
</[method_name]Response>
</soap:Body>
</soap:Envelope>
``` where [outbound_method_arguments] is an XML serialized list of outbound parameters from the method_arguments list, and the <[method_name]Result> element contains the result of the operation as defined by the type specified in [return_type].

For example, the short hand notation for the GetLanSettings call is described as:

```
string GetLanSettings(
    out bool UseDHCP,
    out string IPAddress,
    out string SubnetMask,
    out string Gateway,
    out DNSSettings DNS
)
```

This call would be serialized in SOAP as follows:

```
Request:
<?xml version="1.0" encoding="utf-8"?>
<soap:Envelope>
    <soap:Body>
        <GetLanSettings>
        </GetLanSettings>
    </soap:Body>
```

```
        </soap:Envelope>
Response:
<?xml version="1.0" encoding="utf-8" ?>
<soap:Envelope>
<soap:Body>
<GetLanSettingsResponse>
    <GetLanSettingsResult>OK</GetLanSettingsResult>
    <UseDHCP>true</Enabled>
    <IPAddress>192.168.0.12</IPAddress>
    <SubnetMask>255.255.255.0</SubnetMask>
    <Gateway>192.168.0.1</Gateway >
    <DNS>
        <Primary>192.168.0.1</Primary>
        <Secondary></Secondary>
    </DNS>
</GetLanSettingsResponse>
</soap:Body>
</soap:Envelope>
```

It should be noted that, in all of the above examples, all XML namespace information has been removed for clarity and ease of understanding.

The following methods may be employed to obtain or set various devices settings:

```
        string GetDeviceSettings(
            out string Type,
            out string DeviceName,
            out string VendorName,
            out string ModelDescription,
            out string ModelName,
            out string FirmwareVersion,
            out string PresentationURL,
            out string [ ] SOAPActions,
            out string [ ] SubDeviceURLs,
            out TaskExtension [ ] Tasks
            )
        string SetDeviceSettings(
            string DeviceName,
            string AdminPassword
            )
        string Reboot( )
        string IsDeviceReady( )
```

The following methods may be used by non-router devices to configure how they connect to the local area network:

```
        string GetLanSettings(
            out bool UseDHCP,
            out string IPAddress,
            out string SubnetMask,
            out string Gateway,
            out DNSSettings DNS
            )
        string SetLanSettings(
            bool UseDHCP,
            string IPAddress,
            string SubnetMask,
            string Gateway,
            DNSSettings DNS
            )
```

The following methods may be used for routers to set how they provide services to the LAN.

```
        string GetRouterLanSettings(
            out string RouterIPAddress,
            out string RouterSubnetMask,
            out bool DHCPServerEnabled
            )
        string SetRouterLanSettings(
            string RouterIPAddress,
            string RouterSubnetMask,
            bool DHCPServerEnabled
            )
        string GetConnectedDevices(
            out ConnectedClient [ ] ConnectedClients
            )
        string GetNetworkStats(
            out NetworkStats [ ] Stats
            )
```

The following methods may be used for any device that supports local wireless network (WLAN).

```
        string GetWLanSettings24(
            out bool Enabled,
            out string MacAddress,
            out string SSID,
            out bool SSIDBroadcast,
            out int Channel
            )
        string SetWLanSettings24(
            bool Enabled,
            string SSID,
            bool SSIDBroadcast, int Channel
            )
        string GetWLanSecurity(
            out bool Enabled,
            out string Type,
            out int WEPKeyBits,
            out int [ ] SupportedWEPKeyBits,
            out string Key,
            out string RadiusIP1,
            out int RadiusPort1,
            out string RadiusIP2,
            out int RadiusPort2
            )
        string SetWLanSecurity(
            bool Enabled,
            string Type,
            int WEPKeyBits,
            string Key,
            string RadiusIP1,
            int RadiusPort1,
            string RadiusIP2,
            int RadiusPort2
            )
        string GetMACFilters2(
            out bool Enabled,
            out bool IsAllowList,
            out MACInfo [ ] MACList
            )
        string SetMACFilters2(
            bool Enabled,
            bool IsAllowList,
            MACInfo [ ] MACList
            )
        string GetWanSettings(
            out string Type,
            out string Username,
            out string Password,
            out int MaxIdleTime,
            out string ServiceName,
            out bool AutoReconnect,
            out string IPAddress,
            out string SubnetMask,
```

```
        out string Gateway,
        out DNSSettings DNS,
        out string MacAddress,
        out int MTU)
string SetWanSettings(
        string Type,
        string Username,
        string Password,
        int MaxIdleTime,
        string ServiceName,
        bool AutoReconnect,
        string IPAddress,
        string SubnetMask,
        string Gateway,
        DNSSettings DNS,
        string MacAddress,
        int MTU
        )
string GetPortMappings(
        out PortMapping[ ] PortMappings
        )
string AddPortMapping(
        string PortMappingDescription,
        string InternalClient,
        string PortMappingProtocol,
        int ExternalPort,
        int InternalPort
        )
string DeletePortMapping(
        string PortMappingProtocol,
        int ExternalPort
        )
string RenewWanConnection(
        int RenewTimeout
        )
String SetAccessPointMode(
        bool IsAccessPoint,
        out string NewIPAddress)
```

Each of the methods that may be employed by various embodiments of the network device management tool 701 will now be discussed in more detail, together with a detailed representation of each method. As used herein, all protocol elements are case-sensitive (for example, SOAPAction values, XML elements, and parameters such as the device Type and WAN connection Type), but with various examples of the network device management tool 701, hexadecimal values, such as in MAC addresses or in WEP keys, may be in either, upper or lowercase. Also, in the methods described below, requests and responses should include a content length, to better give an idea of how much data will be transferred. With various examples of the invention, the format of this content length will conform to the appropriate RFC standard for HTTP messaging.

The GetDeviceSettings method may be used to discover device capabilities. Typically, any device implementing the network device management tool 701 will implement the GetDeviceSettings method. With various examples of the invention, the network device management tool 701 will support this method without authentication by default when requests are received from the local LAN/WLAN. This method is used for device detection and often a client will make this request before it has received authentication credentials.

Syntax:

```
string GetDeviceSettings(
        out string Type,
        out string DeviceName,
        out string VendorName,
        out string ModelDescription,
        out string ModelName,
        out string FirmwareVersion,
        out string PresentationURL,
        out string [ ] SOAPActions,
        out string [ ] SubDeviceURLs
        out TaskExtension [ ] Tasks
        )
```

In:

None

Out:

| String | Description |
| --- | --- |
| string Type | Setting the correct type causes the client 707 to recognize the device and display the correct icon for it on the network map.<br>For values, see the response in this section.<br>Notes<br>These values are all case-sensitive.<br>A router is the Gateway device type. |
| string DeviceName | The name to use for this device. This name is used for the following:<br>End users see the name with the device in the client 707 network map.<br>It may be used for DHCP leases and other network identification.<br>Notes<br>To avoid truncating, a name should be selected that will fit the limited space in the client 707 network map. Because the network map uses proportional space fonts, the maximum recommended length for this name is between 18 and 22 characters.<br>Example:<br>If the network device is named the Acme Media Adapter Model 1500A, a name should be used that fits the available space in the map, such as:<br>Acme Media Adapter<br>Acme Media 1500A<br>Acme Adapter 1500A |
| String VendorName | The name of the device's manufacturer. This is used in combination with ModelName (below). |
| string ModelDescription | A brief description of the device (typically, one sentence). |
| string ModelName | The device's model. This is used in combination with VendorName (above). |
| string FirmwareVersion | The device's firmware version (for example, 1.02) While the format specific to the manufacturer, this information may be configured so that a string-comparison using normal, Roman sort orders can distinguish the difference between a newer firmware version and an older version. |
| string PresentationURL | A URL to the Web-based user interface for administering the device.<br>Use either an absolute path or relative path. |
| string [ ] SOAPActions | A list of all SOAPActions that the device supports. This determines which subset of the network device management tool 701 features that the device supports. |
| string [ ] SubDeviceURLs | May be used with regard to tethered devices, such as portable media players, USB cameras, etc. |
| TaskExtension [ ] Tasks | A list of tasks that the client 707 can expose in its UI. A task shows up as a clickable link in the device's Tasks box in the client 707 network map. When the user clicks the link, the user's default Web browser on the computer opens and displays the page for the specified URL.<br>Each task has the following:<br>A name that is displayed in the UI (for example, Access Wireless Settings)<br>An associated action URL. Use either a relative URL (that is, relative to the PresentationURL) or an absolute URL. |

-continued

A type. Valid types include the following:
Browser: A new browser window opens with the specified URL.
MessageBox: A client message box opens with the text/plain results returned from the given URL
PUI: A network management tool user interface (UI) dialog is launched with the results of the given URL.
Silent: A request is sent to the network device at the given URL and no further client actions are performed.

Return values:

| Value | Description |
|---|---|
| OK | Successful |
| ERROR | Failure |

Sample GetDeviceSettings Request:

```
POST /HNAP1/ HTTP/1.1
Host: 192.168.0.1
Content-Type: text/xml; charset=utf-8
Content-Length: <Number of Bytes/Octets in the Body>
SOAPAction: "http://purenetworks.com/HNAP1/GetDeviceSettings"
<?xml version="1.0" encoding="utf-8"?>
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/"
>
    <soap:Body>
        <GetDeviceSettings xmlns="http://purenetworks.com/HNAP1/" />
    </soap:Body>
</soap:Envelope>
```

Sample GetDeviceSettings Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <GetDeviceSettingsResponse xmlns="http://purenetworks.com/HNAP1/">
            <GetDeviceSettingsResult>string</GetDeviceSettingsResult>
            <Type>[Computer | ComputerServer | WorkstationComputer | LaptopComputer | Gateway | GatewayWithWiFi | DigitalDVR | DigitalJukebox | MediaAdapter | NetworkCamera | NetworkDevice | NetworkDrive | NetworkGameConsole | NetworkPDA | NetworkPrinter | NetworkPrintServer | PhotoFrame | VOIPDevice | WiFiAccessPoint]</Type>
            <DeviceName>string</DeviceName>
            <VendorName>string</VendorName>
            <ModelDescription>string</ModelDescription>
            <ModelName>string</ModelName>
            <FirmwareVersion>string</FirmwareVersion>
            <PresentationURL>string</PresentationURL>
            <SOAPActions>
                <string>string</string>
                <string>string</string>
            </SOAPActions>
            <SubDeviceURLs>
                <string>string</string>
                <string>string</string>
            </SubDeviceURLs>
            <Tasks>
                <TaskExtension>
                    <Name>string</Name>
                    <URL>string</URL>
                    <Type>[Browser | MessageBox | PUI | Silent]</Type>
                </TaskExtension>
                <TaskExtension>
                    <Name>string</Name>
                    <URL>string</URL>
                    <Type>[Browser | MessageBox | PUI | Silent]</Type>
                </TaskExtension>
            </Tasks>
        </GetDeviceSettingsResponse>
    </soap:Body>
</soap:Envelope>
```

The SetDeviceSettings method may be used to set a new name for the device, as follows:

Syntax:

```
string SetDeviceSettings(
    string DeviceName,
    string AdminPassword
)
```

In:

| String | Description |
|---|---|
| string DeviceName | The name to use for this device. This name is used for the following:<br>End users see the name with the device in the client 707 network map.<br>It should be used for DHCP leases and other network identification. |
| string AdminPassword | The administrator password for this device. |

Out:
Return values:

| Value | Description |
|---|---|
| OK | Successful |
| ERROR | Failure |
| REBOOT | Successful but requires a reboot |

Sample SetDeviceSettings Request:

```
POST /HNAP1/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/SetDeviceSettings"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <SetDeviceSettings xmlns="http://purenetworks.com/HNAP1/">
            <DeviceName>string</DeviceName>
            <AdminPassword>string</AdminPassword>
        </SetDeviceSettings>
    </soap:Body>
</soap:Envelope>
```

Sample SetDeviceSettings Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope xmlns:xsi="http://www.w3.org/2001/
XMLSchema-instance"
xmlns:xsd="http://www.w3.org/2001/XMLSchema"
xmlns:soap="http://schemas.xmlsoap.org/soap/envelope/">
   <soap:Body>
      <SetDeviceSettingsResponse xmlns="http://purenetworks.com/
      HNAP1/">
         <SetDeviceSettingsResult>string</SetDeviceSettingsResult>
      </SetDeviceSettingsResponse>
   </soap:Body>
</soap:Envelope>
```

The IsDeviceReady method may be used to verify a user's credentials in certain circumstances (for example, when a user types his or her administrative user name and password to make sure logging in works correctly). Because IsDeviceReady does this, the method should be setup to require authentication.

Syntax:

string IsDeviceReady( )

In:

None
Out:

None

Return values:

| Value | Description |
|---|---|
| OK | The device is ready. If the device returns OK, it must be available to respond to additional requests until frirther state changes are made. This method will be used after an operation requires a reboot to poll the network device to determine whether the reboot or sequence of reboots is completed. |
| ERROR | The device is not ready. |

Sample IsDeviceReady Request:

```
POST /SOAP1.0/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/IsDeviceReady"
<?xml version="1.0" encoding="utf-8"?>
<soap:Envelope xmlns:xsi="http://www.w3.org/2001/
XMLSchema-instance"
xmlns:xsd="http://www.w3.org/2001/XMLSchema"
xmlns:soap="http://schemas.xmlsoap.org/soap/envelope/">
   <soap:Body>
      <IsDeviceReady
         xmlns="http://purenetworks.com/HNAP1/" />
      </soap:Body>
</soap:Envelope>
```

Sample IsDeviceReady Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope xmlns:xsi="http://www.w3.org/2001/
XMLSchema-instance"
xmlns:xsd="http://www.w3.org/2001/XMLSchema"
xmlns:soap="http://schemas.xmlsoap.org/soap/envelope/">
   <soap:Body>
      <IsDeviceReadyResponse
         xmlns="http://purenetworks.com/HNAP1/">
         <IsDeviceReadyResult>string</IsDeviceReadyResult>
      </IsDeviceReadyResponse>
   </soap:Body>
</soap:Envelope>
```

The Reboot method may be used for either of the following:
  As part of connection repair
  To cause a device to reinitialize its network connections (for example if the network device does not know about a device's DHCP address, the Reboot method can be invoked to make the device acquire an IP address again).

Syntax:

string Reboot( )

In:

None
Out:

None

Return values:

| Value | Description |
|---|---|
| REBOOT | Successful |
| ERROR | Failure |

Sample Reboot Request:

```
POST /SOAP1.0/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/Reboot"
<?xml version="1.0" encoding="utf-8"?>
<soap:Envelope xmlns:xsi="http://www.w3.org/2001/
XMLSchema-instance"
xmlns:xsd="http://www.w3.org/2001/XMLSchema"
xmlns:soap="http://schemas.xmlsoap.org/soap/envelope/">
   <soap:Body>
      <Reboot
         xmlns="http://purenetworks.com/HNAP1/" />
      </soap:Body>
</soap:Envelope>
```

Sample Reboot Response:

```
HTTP/1.1 200 OK
Content-Type: text/xml; charset=utf-8
```

-continued

```
Content-Length: <Number of Bytes/Octets in the Body>
<?xml version="1.0" encoding="utf-8"?>
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/">
    <soap:Body>
        <RebootResponse
            xmlns="http://purenetworks.com/HNAP1/">
            <RebootResult>string</RebootResult>
        </RebootResponse>
    </soap:Body>
</soap:Envelope>
```

The RenewWanConnection method may be used to renew the router's WAN connection. If the router is configured for DHCP, RenewWanConnection renews the DHCP lease. If the router is configured for PPPoE, RenewWanConnection renews the PPPoE connection. Optionally, this method can be used to restart the internal WAN driver. Typically, the router should make every attempt possible to fix its upstream connection without disturbing the LAN side at all. It should be noted that this method should stay distinct from Reboot( ). The RenewWanConnection method keeps all LAN DHCP information intact and has a smaller impact on the device than the Reboot method typically will.

Syntax:

string RenewWanConnection(
    int RenewTimeout
)

In:

| String | Description |
| --- | --- |
| int RenewTimeout | Maximum time in seconds to wait to renew. Use a value from 1 through 120. After the time expires, return a failure. |

Out:

None

Return values:

| Value | Description |
| --- | --- |
| OK | Successful |
| ERROR | Failure |

Sample RenewWanConnection Request:

```
POST /SOAP1.0/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/RenewWanConnection"
<?xml version="1.0" encoding="utf-8"?>
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/">
    <soap:Body>
        <RenewWanConnection
            xmlns="http://purenetworks.com/HNAP1/">
            <RenewTimeout>[1 through 120]</RenewTimeout>
```

-continued

```
        </RenewWanConnection>
    </soap:Body>
</soap:Envelope>
```

Sample RenewWanConnection Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope xmlns:xsi="http://www.w3.org/2001/XMLSchema-instance"
    xmlns:xsd="http://www.w3.org/2001/XMLSchema"
    xmlns soap="http://schemas.xmlsoap.org/soap/envelope/">
    <soap:Body>
        <RenewWanConnectionResponse
            xmlns="http://purenetworks.com/HNAP1/">
            <RenewWanConnectionResult>string</RenewWanConnectionResult>
        </RenewWanConnectionResponse>
    </soap Body>
</soap:Envelope>
```

The SetRouterLanSettings method may be used to set the router's LAN-side IP address, gateway address, and DHCP server status.

Syntax:

string SetRouterLanSettings(
    string RouterIPAddress,
    string RouterSubnetMask,
    bool DHCPServerEnabled
)

In:

| String | Description |
| --- | --- |
| string RouterIPAddress | The IP address for the router on the LAN side (private network), in x.x.x.x decimal form. |
| string RouterSubnetMask | The subnet mask for the LAN side (private network), in x.x.x.x decimal form. |
| bool DHCPServerEnabled | Whether the device is broadcasting the wireless network name (SSID) for network detection (true or false) |

Out:

None

Return values:

| Value | Description |
| --- | --- |
| OK | Successful |
| ERROR | Failure |
| REBOOT | Successful but requires a reboot |

Sample SetRouterLanSettings Request:

```
POST /SOAP1.0/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/SetRouterLanSettings"
<?xml version="1.0" encoding="utf-8"?>
```

-continued

```
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/">
    <soap:Body>
        <SetRouterLanSettings xmlns="http://purenetworks.com/HNAP1/">
            <RouterIPAddress>string</RouterIPAddress>
            <RouterSubnetMask>string</RouterSubnetMask>
            <DHCPServerEnabled>[true | false]</DHCPServerEnabled>
        </SetRouterLanSettings>
    </soap:Body>
</soap:Envelope>
```

Sample SetRouterLanSettings Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/">
    <soap:Body>
        <SetRouterLanSettingsResponse xmlns="http://purenetworks.com/HNAP1/">
            <SetRouterLanSettingsResult>string
            </SetRouterLanSettingsResult>
        </SetRouterLanSettingsResponse>
    </soap:Body>
</soap:Envelope>
```

The GetConnectedDevices method may be used to obtain information about which devices are connected to this router. The GetConnectedDevices method includes a port name for the type of connection the device is using.

| Syntax: |
|---|
| string GetConnectedDevices(<br>    out ConnectedClient [ ] ConnectedClients<br>) |

| In: |
|---|
| None |

| Out: | |
|---|---|
| String | Description |
| ConnectedClient [ ] ConnectedClients | Array of currently-connected clients. For information on how to set up this array, see Table 12 - The ConnectedClient Structure. |

| Return values: | |
|---|---|
| Value | Description |
| OK | Successful |
| ERROR | Failure |

Sample GetConnectedDevices Request:

```
POST /SOAP1.0/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/GetConnectedDevices"
<?xml version="1.0" encoding="utf-8"?>
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/">
    <soap:Body>
        <GetConnectedDevices
            xmlns="http://purenetworks.com/HNAP1/" />
    </soap:Body>
</soap:Envelope>
```

Sample GetConnectedDevices Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope
    xmlns:xsi="http://www.w3.org/2001/XMLSchema-instance"
    xmlns:xsd="http://www.w3.org/2001/XMLSchema"
    xmlns:soap="http://schemas.xmlsoap.org/soap/envelope/">
    <soap:Body>
        <GetConnectedDevicesResponse
            xmlns="http://purenetworks.com/HNAP1/">
            <GetConnectedDevicesResult>string
            </GetConnectedDevicesResult>
            <ConnectedClients>
                <ConnectedClient>
                    <ConnectTime>dateTime</ConnectTime>
                    <MacAddress>string</MacAddress>
                    <DeviceName>string</DeviceName>
                    <PortName>string</PortName>
                    <Wireless>boolean</Wireless>
                    <Active>[true | false]</Active>
                </ConnectedClient>
                <ConnectedClient>
                    <ConnectTime>dateTime</ConnectTime>
                    <MacAddress>string</MacAddress>
                    <DeviceName>string</DeviceName>
                    <PortName>string</PortName>
                    <Wireless>boolean</Wireless>
                    <Active>[true | false]</Active>
                </ConnectedClient>
            </ConnectedClients>
        </GetConnectedDevicesResponse>
    </soap:Body>
</soap:Envelope>
```

The GetNetworkStats method may be used to read network statistics about ports on the router.

| Syntax: |
|---|
| public string GetNetworkStats(<br>    out NetworkStats [ ] Stats<br>) |

| In: |
|---|
| None |

| Out: | |
|---|---|
| String | Description |
| NetworkStats [ ] Stats | Array of NetworkStats structures detailing network statistics for ports on the router. |

| Return values: | |
|---|---|
| Value | Description |
| OK | Successful |
| ERROR | Failure |

Sample GetNetworkStats Request:

```
POST /SOAP1.0/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/GetNetworkStats"
<?xml version="1.0" encoding="utf-8"?>
<soap:Envelope
 xmlns:xsi="http://www.w3.org/2001/XMLSchema-instance"
 xmlns:xsd="http://www.w3.org/2001/XMLSchema"
 xmlns:soap="http://schemas.xmlsoap.org/soap/envelope/">
    <soap:Body>
      <GetNetworkStats
        xmlns="http://purenetworks.com/HNAP1/" />
    </soap:Body>
</soap:Envelope>
```

Sample GetNetworkStats Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope
 xmlns:xsi="http://www.w3.org/2001/XMLSchema-instance"
 xmlns:xsd="http://www.w3.org/2001/XMLSchema"
 xmlns:soap="http://schemas.xmlsoap.org/soap/envelope/">
    <soap:Body>
      <GetNetworkStatsResponse
        xmlns="http://purenetworks.com/HNAP1/">
        <GetNetworkStatsResult>string</GetNetworkStatsResult>
        <Stats>
          <NetworkStats>
            <PortName>string</PortName>
            <PacketsReceived>long</PacketsReceived>
            <PacketsSent>long</PacketsSent>
            <BytesReceived>long</BytesReceived>
            <BytesSent>long</BytesSent>
          </NetworkStats>
          <NetworkStats>
            <PortName>string</PortName>
            <PacketsReceived>long</PacketsReceived>
            <PacketsSent>long</PacketsSent>
            <BytesReceived>long</BytesReceived>
            <BytesSent>long</BytesSent>
          </NetworkStats>
        </Stats>
      </GetNetworkStatsResponse>
    </soap:Body>
</soap:Envelope>
```

The GetWLanSettings24 method may be used with wireless (Wi-Fi) routers and access points that operate on the 2.4 GHz frequency (802.11b, -g, or -n). The GetWLanSettings24 method obtains the settings on the 2.4 GHz wireless interface (for example, the SSID). The settings obtained are the last settings configured It should be noted that these settings might not be the current, active settings.

| Syntax: |
|---|
| string GetWLanSettings24(<br>    out bool Enabled,<br>    out string MacAddress,<br>    out string SSID,<br>    out bool SSIDBroadcast,<br>    out int Channel<br>    ) |

| In: |
|---|
| None |

| Out: | |
|---|---|
| String | Description |
| bool Enabled | Whether the 2.4 GHz interface is enabled (true or false). |
| string MacAddress | The MAC address for this interface in xx:xx:xx:xx:xx:xx hexadecimal form. The device will still return this, even if the WLAN interface is currently disabled. |
| string SSID | The wireless network name (SSID) for this wireless band. This should still be returned even if the WLAN interface is currently disabled. |
| bool SSIDBroadcast | Whether the device is broadcasting the wireless network name (SSID) for network detection (true or false). This should still be returned even if the WLAN interface is currently disabled. |
| string Channel | The channel number in the 2.4 GHz frequency (that is, 1 through 14). This should still be returned even if the WLAN interface is currently disabled. Multi-channel devices that do not have channel configuration should return zero (0). |

| Return values: | |
|---|---|
| Value | Description |
| OK | Successful |
| ERROR | Failure |

Sample GetWLanSettings24 Request:

```
POST /HNAP1/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/GetWLanSettings24"
<?xml version="1.0" encoding="utf-8"?>
<soap:Envelope
 xmlns:xsi="http://www.w3.org/2001/XMLSchema-instance"
 xmlns:xsd="http://www.w3.org/2001/XMLSchema"
 xmlns:soap="http://schemas.xmlsoap.org/soap/envelope/">
    <soap:Body>
      <GetWLanSettings24 xmlns="http://purenetworks.com/HNAP1/" />
    </soap:Body>
</soap:Envelope>
```

Sample GetWLanSettings24 Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope
 xmlns:xsi="http://www.w3.org/2001/XMLSchema-instance"
 xmlns:xsd="http://www.w3.org/2001/XMLSchema"
```

```
xmlns:soap="http://schemas.xmlsoap.org/soap/envelope/">
  <soap:Body>
    <GetWLanSettings24Response
    xmlns="http://purenetworks.com/HNAP1/">
      <GetWLanSettings24Result>string</GetWLanSettings24Result>
      <Enabled>boolean</Enabled>
      <MacAddress>string</MacAddress>
      <SSID>string</SSID>
      <SSIDBroadcast>boolean</SSIDBroadcast>
      <Channel>int</Channel>
    </GetWLanSettings24Response>
  </soap:Body>
</soap:Envelope>
```

The SetWLanSettings24 method may be used with wireless (Wi-Fi) routers and access points that operate on the 2.4 GHz frequency (802.11b, -g, or -n). The SetWLanSettings24 method obtains the settings on the 2.4 ghz wireless interface (for example, the SSID).

| Syntax: |
| --- |
| string SetWLanSettings24( |
|     bool Enabled, |
|     string SSID, |
|     bool SSIDBroadcast, |
|     int Channel |
|     ) |

| In: | |
| --- | --- |
| String | Description |
| bool Enabled | Whether the 2.4 GHz interface is enabled (true or false). |
| string SSID | The wireless network name (SSID) for this wireless band. This should still be returned even if the WLAN interface is currently disabled. |
| bool SSIDBroadcast | Whether the device is broadcasting the wireless network name (SSID) for network detection (true or false). This should still be returned even if the WLAN interface is currently disabled. |
| string Channel | The channel number in the 2.4 GHz band (that is, 1 through 14). This should still be returned even if the WLAN interface is currently disabled. Multi-channel devices that do not have channel configuration should ignore this parameter. |

| Out: | |
| --- | --- |
| Return values: | |
| Value | Description |
| OK | Successful |
| ERROR | Failure |
| REBOOT | Successful but requires a reboot |

Sample SetWLanSettings24 Request:

```
POST /HNAP1/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/SetWLanSettings24"
<?xml version="1.0" encoding="utf-8"?>
<soap:Envelope
xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <SetWLanSettings24 xmlns="http://purenetworks.com/HNAP1/">
      <Enabled>boolean</Enabled>
      <SSID>string</SSID>
      <SSIDBroadcast>boolean</SSIDBroadcast>
      <Channel>int</Channel>
    </SetWLanSettings24>
  </soap:Body>
</soap:Envelope>
```

Sample SetWLanSettings24 Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope
xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <SetWLanSettings24Response
    xmlns="http://purenetworks.com/HNAP1/">
      <SetWLanSettings24Result>string</SetWLanSettings24Result>
    </SetWLanSettings24Response>
  </soap:Body>
</soap:Envelope>
```

The GetWLanSecurity method may be used to obtain the security settings for wireless connections. These settings apply to both the 2.4 GHz and 5.4 GHz frequencies.

| Syntax: |
| --- |
| string GetWLanSecurity( |
|     out bool Enabled, |
|     out string Type, |
|     out int WEPKeyBits, |
|     out int [ ] SupportedWEPKeyBits, |
|     out string Key, |
|     out string RadiusIP1, |
|     out int RadiusPort1, |
|     out string RadiusIP2, |
|     out int RadiusPort2 |
|     ) |

|  |  |
|---|---|
| \-continued | |
| In: | |
| None | |
| Out: | |
| String | Description |
| bool Enabled | Whether security is enabled (true or false). When this is set to false, any other security settings can remain in place but will be ignored. |
| string Type The type of security used | WEP The device uses Wired Equivalent Privacy (WEP) wireless security. WPA The device uses Wi-Fi Protected Access (WPA) wireless security. This should still be returned even if security is not enabled. |
| int WEPKeyBits | Number of bits to use for the WEP key: 64 or 128 This should still be returned even if security is not enabled or if WPA is configured (that is, WPA would ignore this field). |
| int [ ] SupportedWEPKeyBits | Standard SOAP array of integers for WEPKeyBits. This should still be returned even if security is not enabled but or if WPA is currently configured (that is, WPA would ignore this field). |
| string Key | The WEP key or WPA passphrase: With WEP, the key must be in hexadecimal form (case insensitive for the hex digits). With WPA, the passphrase length must support the WPA standard length of 63 characters. This should still be returned even if security is not enabled. |
| string RadiusIP1 | If RADIUS is used, type the primary/preferred RADIUS server's IP address in x.x.x.x format. If RADIUS is not used, use " ". This should still be returned even if security is currently disabled (but it can be blank if RADIUS is not configured). |
| Int RadiusPort1 | The RADIUS server port number. This should still be returned even if security is currently disabled. |
| string RadiusIP2 | If RADIUS is used, type the secondary/fallback RADIUS server's IP address in x.x.x.x format. With various embodiments of the invention, the network device management tool 701 will use this only if the RadiusIP1 (above) is not responding If RADIUS is not used, use " ". This should still be returned even if security is currently disabled (but it can be blank if RADIUS is not configured). |
| Int RadiusPort2 | The secondary/fallback RADIUS server's port number. This should still be returned even if security is currently disabled. |
| Return values: | |
| Value | Description |
| OK | Successful |
| ERROR | Failure |

The SetWLanSecurity method may be used to set the security settings for wireless connections. These settings apply to both the 2.4 GHz and 5.4 GHz frequencies.

|  |
|---|
| Syntax: |
| public string SetWLanSecurity( bool Enabled, string Type, int WEPKeyBits, string Key, string RadiusIP1, int RadiusPort1, string RadiusIP2, int RadiusPort2 ) |

-continued

In:

| String | Description |
| --- | --- |
| bool Enabled | Whether security is enabled (true or false). When this is set to false, any other security settings can remain in place but will be ignored. |
| string Type The type of security used | WEP The device uses Wired Equivalent Privacy (WEP) wireless security. WPA The device uses Wi-Fi Protected Access (WPA) wireless security. This should still be returned even if security is not enabled. |
| int WEPKeyBits | Number of bits to use for the WEP key: 64 or 128 This should still be returned even if security is not enabled or if WPA is configured (that is, WPA would ignore this field). |
| int [ ] SupportedWEPKeyBits | Standard SOAP array of integers for WEPKeyBits. This should still be returned even if security is not enabled but or if WPA is currently configured (that is, WPA would ignore this field). |
| string Key | The WEP key or WPA passphrase: With WEP, the key must be in hexadecimal form (case insensitive for the hex digits). With WPA, the passphrase length must support the WPA standard length of 63 characters. This should still be returned even if security is not enabled. |
| string RadiusIP1 | If RADIUS is used, type the primary/preferred RADIUS server's IP address in x.x.x.x format. If RADIUS is not used, use " ". This should still be returned even if security is currently disabled (but it can be blank if RADIUS is not configured). |
| Int RadiusPort1 | The RADIUS server port number. This should still be returned even if security is currently disabled. |
| string RadiusIP2 | If RADIUS is used, type the secondary/fallback RADIUS server's IP address in x.x.x.x format. With various examples of the invention, the network device management tool 701 may use this only if the RadiusIP1 (above) is not responding If RADIUS is not used, use " ". This should still be returned even if security is currently disabled (but it can be blank if RADIUS is not configured). |
| Int RadiusPort2 | The secondary/fallback RADIUS server's port number. This should still be returned even if security is currently disabled. |

Out:

None

Return values:

| Value | Description |
| --- | --- |
| OK | Successful |
| ERROR | Failure |

Sample SetWLanSecurity Request:

```
POST /HNAP1/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/SetWLanSecurity"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
```

-continued

```
    <SetWLanSecurity xmlns="http://purenetworks.com/HNAP1/">
      <Enabled>[true | false]</Enabled>
      <Type>string</Type>
      <WEPKeyBits>[64 | 128]</WEPKeyBits>
      <Key>string</Key>
      <RadiusIP1>string</RadiusIP1>
      <RadiusPort1>int</RadiusPort1>
      <RadiusIP2>string</RadiusIP2>
      <RadiusPort2>int</RadiusPort2>
    </SetWLanSecurity>
  </soap:Body>
</soap:Envelope>
```

Sample SetWLanSecurity Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema"
xmlns:soap="http://schemas.xmlsoap.org/soap/envelope/">
    <soap:Body>
        <SetWLanSecurityResponse xmlns="http://purenetworks.com/
        HNAP1/">
            <SetWLanSecurityResult>string</SetWLanSecurityResult>
        </SetWLanSecurityResponse>
    </soap:Body>
</soap:Envelope>
```

The GetMACFilters2 method returns a MAC address filters for the network device. A MAC address filter allows a network device to allow or deny access to a network based on the MAC address of the network device attempting to access the network.

Syntax:

```
string GetMACFilters2(
    out bool Enabled,
    out bool IsAllowList,
    out MACInfo [ ] MACList
)
```

In:

None

Out:

| Value | Description |
| --- | --- |
| String GetMACFiltersResult | OK\|ERROR\|REBOOT |
| bool Enabled | Whether filters are enabled (true or false). |
| bool IsAllowList | true By default, all devices not listed in the MACList are allowed to connect.<br>false By default, all devices not listed in the MACList are denied. |
| MACInfo [ ] MACList | A list of MACInfo structures allowed or denied. |

Return values:

| Value | Description |
| --- | --- |
| OK | Successful |
| ERROR | Failure |

Sample GetMACFilters2 Request:

```
POST /HNAP1/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/GetMACFilters2"
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema"
xmlns:soap="http://schemas.xmlsoap.org/soap/envelope/">
    <soap:Body>
        <GetMACFilters2 xmlns="http://purenetworks.com/HNAP1/" />
    </soap:Body>
</soap:Envelope>
```

Sample GetMACFilters2 Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema"
xmlns:soap="http://schemas.xmlsoap.org/soap/envelope/">
    <soap:Body>
        <GetMACFilters2Response xmlns="http://purenetworks.com/
        HNAP1/">
            <GetMACFilters2Result>string</GetMACFilters2Result>
            <Enabled>[true | false]</Enabled>
            <DefaultAllow>[true | false]</DefaultAllow>
            <MACList>
                <MACInfo>
                    <MacAddress>string</MacAddress>
                    <DeviceName>string</DeviceName>
                </MACInfo>
            </MACList>
        </GetMACFiltersResponse>
    </soap:Body>
</soap:Envelope>
```

The SetMACFilters2 method allows a network device to set MAC Address filtering policy in the network device. A MAC Address filter entry determines whether or not a network device with a given MAC address is allowed or denied access to the network.

Syntax:

```
string SetMACFilters2(
    bool Enabled,
    bool IsAllowList,
    MACInfo [ ] MACList
)
```

In:

| Value | Description |
| --- | --- |
| bool Enabled | Whether filters are enabled (true or false). |
| bool IsAllowList | true By default, all devices not listed in the MACList are allowed to connect.<br>false By default, all devices not listed in the MACList are denied. |
| String [ ] MACList | A list of MACInfo structures detailing the MAC addresses allowed or denied |

Out:

None

Return values:

| Value | Description |
| --- | --- |
| OK | Successful |
| ERROR | Failure |
| REBOOT | Successful but requires a reboot |

Sample SetMACFilters2 Request:

```
POST /HNAP1/ HTTP/1.1
Host: 192.168.0.1
Authorization: Basic YWMEHZY+
Content-Type: text/xml; charset=utf-8
Content-Length: length
SOAPAction: "http://purenetworks.com/HNAP1/SetMACFilters2"
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema"
xmlns:soap="http://schemas.xmlsoap.org/soap/envelope/">
    <soap:Body>
        <SetMACFilters2 xmlns="http://purenetworks.com/HNAP1/">
            <Enabled>boolean</Enabled>
            <IsAllowList>boolean</IsAllowList>
            <MACList>
                <MACInfo>
                    <MacAddress>string</MacAddress>
                    <DeviceName>string</DeviceName>
                </MACInfo>
                <MACInfo>
                    <MacAddress>string</MacAddress>
                    <DeviceName>string</DeviceName>
                </MACInfo>
            </MACList>
        </SetMACFilters2>
    </soap:Body>
</soap:Envelope>
```

Sample SetMACFilters2 Response:

```
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema"
xmlns:soap="http://schemas.xmlsoap.org/soap/envelope/">
    <soap:Body>
        <SetMACFilters2Response xmlns="http://purenetworks.com/
        HNAP1/">
            <SetMACFilters2Result>string</SetMACFilters2Result>
        </SetMACFilters2Response>
    </soap:Body>
</soap:Envelope>
```

The GetPortMappings method returns one entry on the PortMapping[ ] array for each enabled port mapping currently defined in the router. The concept is that this is the same list of mappings that are created by AddPortMapping and removed by DeletePortMapping. Other mappings defined in the router but which are not "enabled" will not be effected by these APIs.

| Syntax: |
|---|
| string GetPortMappings ( <br>     out PortMapping[ ] PortMappings <br> ) |

| In: | |
|---|---|
| Value | Description |
| PortMapping [ ] PortMappings | Array of port mapping descriptions |

| Out: | |
|---|---|
| None | |

| Return values: | |
|---|---|
| Value | Description |
| OK | Successful |
| ERROR | Failure |

Sample GetPortMappings Request:

```
<?xmnl version="1.0" encoding="utf-8"?>
<soap:Envelope xmlns:xsi="http://www.w3.org/2001/XMLSchema-
instance"
xmlns:xsd="http://www.w3.org/2001/XMLSchema"
xmlns:soap="http://schemas.xmlsoap.org/soap/envelope/">
    <soap:Body>
        <GetPortMappings xmlns="http://purenetworks.com/HNAP1/" />
    </soap:Body>
</soap:Envelope>
```

Sample GetPortMappings Response:

```
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema"
xmlns:soap="http://schemas.xmlsoap.org/soap/envelope/">
    <soap:Body>
        <GetPortMappingsResponse xmlns="http://purenetworks.com/
        HNAP1/">
            <GetPortMappingsResult>string</GetPortMappingsResult>
            <PortMappings>
                <PortMapping>
                    <PortMappingDescription>string</PortMappingDescription>
                    <InternalClient>string</InternalClient>
                    <PortMappingProtocol>string</PortMappingProtocol>
                    <ExternalPort>int</ExternalPort>
                    <InternalPort>int</InternalPort>
                </PortMapping>
                <PortMapping>
                    <PortMappingDescription>string</PortMappingDescription>
                    <InternalClient>string</InternalClient>
                    <PortMappingProtocol>string</PortMappingProtocol>
                    <ExternalPort>int</ExternalPort>
                    <InternalPort>int</InternalPort>
                </PortMapping>
            </PortMappings>
        </GetPortMappingsResponse>
    </soap:Body>
</soap:Envelope>
```

The AddPortMapping method may be used to set port forwarding on the router to enable applications to connect in through the firewall. When this method is called, it adds a new port forwarding entry to the port forwarding table in the router. It should be noted that, if the client 707 intends to map both UDP and TCP for a given port, it will require two separate PortMapping records.

Syntax:

string AddPortMapping(
   string PortMappingDescription,
   string InternalClient,
   string PortMappingProtocol,
   int ExternalPort,
   int InternalPort
)

In:

| Value | Description |
|---|---|
| string PortMappingDescription | Friendly name for port mapping. String does not have to be unique per port mapping. |
| string InternalClient | IP Address of target host on LAN in x.x.x.x decimal form. |
| string PortMappingProtocol | Can be "UDP" or "TCP". |
| int ExternalPort | WAN side port number (ie. 80) |
| int InternalPort | Port on target host on LAN (ie.80) |

Out:

None

Return values:

| Value | Description |
|---|---|
| OK | Successful |
| ERROR | Failure |
| REBOOT | Successful but requires a reboot. |

Sample AddPortMapping Request:

```
POST /HNAP1/ HTTP/1.1
Host: 192.168.0.1
Authorization: Basic YWMEHZY+
Content-Type: text/xml; charset=utf-8
Content-Length: length
SOAPAction: "http://purenetworks.com/HNAP1/AddPortMapping"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <AddPortMapping xmlns="http://purenetworks.com/HNAP1/">
      <PortMappingDescription>string</PortMappingDescription>
      <InternalClient>string</InternalClient>
      <PortMappingProtocol>string</PortMappingProtocol>
      <ExternalPort>int</ExternalPort>
      <InternalPort>int</InternalPort>
    </AddPortMapping >
  </soap:Body>
</soap:Envelope>
```

Sample AddPortMapping Response:

```
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <AddPortMappingResponse xmlns="http://purenetworks.com/HNAP1/">
      <AddPortMappingResult>string</AddPortMappingResult>
    </AddPortMappingResponse>
  </soap:Body>
</soap:Envelope>
```

The DeletePortMapping method may be used to delete a previously set port forwarding entry on the router. More particularly, when this method is called, it removes any existing port forwarding entry that matches from the port forwarding table in the router.

Syntax:

string DeletePortMapping(
   string PortMappingProtocol,
   int ExternalPort
)

In:

| Value | Description |
|---|---|
| string PortMappingProtocol | Can be "UDP" or "TCP". |
| int ExternalPort | WAN side port number (ie. 80) |

Out:

None

Return values:

| Value | Description |
|---|---|
| OK | Successful |
| ERROR | Failure |
| REBOOT | Successful but requires a reboot. |

Sample DeletePortMapping Request:

```
POST /HNAP1/ HTTP/1.1
Host: 192.168.0.1
Authorization: Basic YWMEHZY+
Content-Type: text/xml; charset=utf-8
Content-Length: length
SOAPAction: "http://purenetworks.com/HNAP1/DeletePortMapping"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <DeletePortMapping xmlns="http://purenetworks.com/HNAP1/">
      <PortMappingProtocol>string</PortMappingProtocol>
      <ExternalPort>int</ExternalPort>
    </DeletePortMapping >
  </soap:Body>
</soap:Envelope>
```

Sample DeletePortMapping Response:

```
HTTP/1.1 200 OK
Content-Type: text/xml; charset=utf-8
Content-Length: length
```

-continued

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <DeletePortMappingResponse xmlns="http://purenetworks.com/HNAP1/">
            <DeletePortMappingResult>string</DeletePortMappingResult>
        </DeletePortMappingResponse>
    </soap:Body>
</soap:Envelope>
```

The GetWanSettings method returns the current network settings for the WAN connection of a router. This method may be also used to return the previous static IP address used by the router.

Syntax:

```
string GetWanSettings(
    out string Type,
    out string Username,
    out string Password,
    out int MaxIdleTime,
    out int MTU,
    out string ServiceName,
    out bool AutoReconnect,
    out string IPAddress,
    out string SubnetMask,
    out string Gateway,
    out DNSSettings DNS,
    out string Mac Address
    )
```

In:

None

Out:

| String | Description |
|---|---|
| string GetWanSettingsResult | |
| string Type | The type of configuration: |
| | DHCP |
| | DHCPPPPoE |
| | Static |
| | StaticPPPoE |
| string Username | If the Type is set to either DHCPPPPoE or StaticPPPoE, then the login user name should be included. Otherwise, leave blank. |
| string Password | If the Type is set to either DHCPPPPoE or StaticPPPoE, then the login password should be included. Otherwise, leave blank. |
| int MaxIdleTime | If the Type is set to either DHCPPPPoE or StaticPPPoE, then the maximum time that the PPPoE will stay idle should be included. The time may be specified in seconds. The time can be specified in large values (for example, greater than 100,000). Otherwise, use 0 (zero), meaning no time-out. |
| string ServiceName | If the set Type is set to either DHCPPPPoE or StaticPPPoE, then the service name for the PPPoE connection should be included. Otherwise, leave blank. |
| bool AutoReconnect | If the set Type is set to either DHCPPPPoE or StaticPPPoE, then this value is set to true if it is desired for the PPPoE connection to automatically reconnect when the connection is dropped. Otherwise, use false. |
| string IP Address | The IP address for this router in x.x.x.x format. If the Type is set to either DHCP or DHCPPPPoE, this returns the DHCP-configured values. |
| string SubnetMask | The subnet mask IP address for this router in x.x.x.x format. If the Type is set to either DHCP or DHCPPPPoE, this returns the DHCP-configured values. |
| string Gateway | The gateway IP address for this router in x.x.x.x format. If the Type is set to either DHCP or DHCPPPPoE, this returns the DHCP-configured values. |
| DNSSettings DNS | The DNS settings for this router. If both DNS settings are blank, this signifies auto-configuration using DHCP. These must not be blank; they are either the user-configured values or the DHCP-server assigned values. |
| string MacAddress | The MAC address on the WAN interface. Use the XX:XX:XX:XX:XX:XX format. |
| int MTU | The maximum packet size (maximum transmission unit (MTU) |

Return values:

| Value | Description |
|---|---|
| OK | Successful |
| ERROR | Failure |

Sample GetWanSettings Request:

```
POST /SOAP1.0/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/GetWanSettings"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <GetWanSettings
            xmlns="http://purenetworks.com/HNAP1/" />
    </soap:Body>
</soap:Envelope>
```

Sample GetWanSettings Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <GetWanSettingsResponse
            xmlns="http://purenetworks.com/HNAP1/">
            <GetWanSettingsResult>string</GetWanSettingsResult>
            <Type>[DHCP | DHCPPPPoE | Static | StaticPPPoE]</Type>
            <Username>string</Username>
            <Password>string</Password>
            <IPAddress>0.0.0.0</IPAddress>
            <SubnetMask>0.0.0.0</SubnetMask>
            <Gateway>0.0.0.0</Gateway>
            <DNS>
                <Primary>0.0.0.0</Primary>
                <Secondary>0.0.0.0</Secondary>
            </DNS>
            <MacAddress>string</MacAddress>
            <MTU>int</MTU>
        </GetWanSettingsResponse>
```

-continued

```
</soap:Body>
</soap:Envelope>
```

The SetWanSettings method sets the WAN connection information for a router. The WAN connection information is used to connect the WAN network adapter to another network.

Syntax:

```
string SetWanSettings(
    string Type,
    string Username,
    string Password,
    int MaxIdleTime,
    string ServiceName,
    bool AutoReconnect,
    string IPAddress,
    string SubnetMask,
    string Gateway,
    DNSSettings DNS,
    string MacAddress
)
```

In:

| String | Description |
|---|---|
| string Type | The type of configuration:<br>DHCP<br>DHCPPPPoE<br>Static<br>StaticPPPoE |
| string Username | If the Type is set to either DHCPPPPoE or StaticPPPoE, then the login user name is included. Otherwise, leave blank. |
| string Password | If the Type is set to either DHCPPPPoE or StaticPPPoE, then the login password is included.. Otherwise, leave blank. |
| int MaxIdleTime | If the Type is set to either DHCPPPPoE or StaticPPPoE, then the maximum time that the PPPoE will stay idle is included.<br>The time may be specified in seconds. The time may be specified in large values (for example, greater than 100,000).<br>Otherwise, use 0 (zero), meaning no time-out. |
| string ServiceName | If the Type is set to either DHCPPPPoE or StaticPPPoE, then either:<br>If a service name is required, the service name for the PPPoE connection is included..<br>If a service name is not required, leave blank.<br>Otherwise, leave blank. |
| bool AutoReconnect | If the Type is set to either DHCPPPPoE or StaticPPPoE, then this value is set to true if it is desired for the PPPoE connection to automatically reconnect when the connection is dropped.<br>Otherwise, use false. |
| string IPAddress | If Type is Static or StaticPPPoE, specify the IP address for this router in x.x.x.x format.<br>Otherwise, leave blank. |
| string SubnetMask | If Type is Static, specify the subnet mask IP address for this router in x.x.x.x format.<br>Otherwise, leave blank. |
| string Gateway | If Type is Static, specify the gateway IP address for this router in x.x.x.x format.<br>Otherwise, leave blank. |
| DNSSettings DNS | The DNS settings for this router.<br>If Type is Static, specify the DNS settings for this router.<br>If Type is StaticPPPoE, you can leave this blank.<br>If both DNS settings are blank, this signifies auto-configuration using DHCP.<br>DNS settings may be set for DHCP or PPPoE, and will override the DHCP-supplied servers. |
| string MacAddress | The MAC address on the WAN interface.<br>Use the XX:XX:XX:XX:XX:XX format. |
| int MTU | If the router supports configurable maximum transmission units (MTUs), specify the maximum packet size.<br>If not, the router will ignore this parameter. |

Out:
Return values:

| Value | Description |
|---|---|
| OK | Successful |
| ERROR | Failure |
| REBOOT | Successful but requires reboot |

Sample SetWanSettings Request:

```
POST /HNAP1/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/SetWanSettings"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <SetWanSettings xmlns="http://purenetworks.com/HNAP1/">
            <Type>[DHCP | DHCPPPPoE | Static | StaticPPPoE]</Type>
            <Username>string</Username>
            <Password>string</Password>
            <MaxIdleTime>int</MaxIdleTime>
            <ServiceName>string</ServiceName>
            <AutoReconnect>[true | false]</AutoReconnect>
            <IPAddress>string</IPAddress>
            <SubnetMask>string</SubnetMask>
            <Gateway>string</Gateway>
            <DNS>
                <Primary>string</Primary>
                <Secondary>string</Secondary>
            </DNS>
            <MacAddress>string</MacAddress>
            <MTU>int</MTU>
        </SetWanSettings>
    </soap:Body>
</soap:Envelope>
```

Sample SetWanSettings Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <SetWanSettingsResponse xmlns="http://purenetworks.com/HNAP1/">
            <SetWanSettingsResult>string</SetWanSettingsResult>
        </SetWanSettingsResponse>
    </soap:Body>
</soap:Envelope>
```

The SetAccessPointMode method can be used to switch the mode of a router from a gateway mode to an access point mode. In gateway mode, the router will respond as a DHCP server using NAT to assign IP addresses to devices connecting on the LAN or WLAN segments. In the access point mode, the router will act as a simple bridge moving data between the WAN and LAN ports. Thus, the SetAccessPointMode method will allow a client 707 to set the mode of operation of a wireless gateway. This can be useful in the case where a router setup tool is attempting to install the router on a new network. If the network to which it is being installed already has a gateway (e.g., an embedded gateway often found in combination DSL modems), then configuring the router in the gateway mode would result in a double-NAT situation. This type of double-NAT situation can make it difficult to successfully network applications together. By detecting this situation at install time and switching the router into access point mode, this situation can be avoided.

Syntax:

```
string SetAccessPointMode(
    bool IsAccessPoint,
    out string NewIPAddress
    )
```

| Field | Description |
|---|---|
| | In: |
| bool IsAccessPoint | If true then the router behaves as an access point. If false the router behaves as a gateway. When IsAccessPoint is true, the router will turn off its internal DHCP server and acquire an IP address from the DHCP server connected to the WAN port. The router will then act as a bridge relaying all packets across the LAN ports, the WAN port and the wireless network. In addition, it should respond to HNAP calls on the WAN port in this mode. For Wireless routers, the value of the Type field returned by the GetDeviceSettings call will change from GatewayWithWiFi to WiFiAccessPoint. For wired routers the Type field will change from Gateway to WiredBridge. The list of SOAPActions should remain the same. The device should still respond to all the regular APIs employed by the network device management tool 701, such as SetWLanSettings24. When IsAccessPoint = false, the router will return to full router mode and enable the internal DHCP server and the firewall between WAN and LAN ports. The Type field should be returned to Gateway WithWifi or Gateway as appropriate and HNAP calls should again be rejected on the WAN port. |
| | Out: |
| string NewIPAddress | The IP address in w.x.y.z dot notation that the router will have on the LAN once after the call and subsequent reboot completes. If this cannot be determined before the response is sent then an empty string should be returned. One would expect the IP returned from GetRouterLanSettings when IsAccessPoint==false and an IP address in the DHCP lease range of the upstream router when IsAccessPoint==true. |

| Return values: | |
|---|---|
| Value | Description |
| OK | Successful |
| ERROR | Failure |
| REBOOT | Successful but requires reboot |

Sample SetAccessPointMode Request:

```
POST /HNAP1/ HTTP/1.1
Host: 192.168.0.1
Authorization: Basic YWMEHZY+
Content-Type: text/xml; charset=utf-8
Content-Length: <Number of Bytes/Octets in the Body>
SOAPAction: "http://purenetworks.com/HNAP1/SetAccessPointMode"
<?xml version="1.0" encoding="utf-8"?>
<soap:Envelope xmlns:xsi="http://www.w3.org/2001/XMLSchema-instance"
  xmlns:xsd="http://www.w3.org/2001/XMLSchema"
  xmlns:soap="http://schemas.xmlsoap.org/soap/envelope/">
    <soap:Body>
        <SetAccessPointMode xmlns="http://purenetworks.com/HNAP1/">
            <IsAccessPoint>[true | false]</IsAccessPoint>
        </SetAccessPointMode>
    </soap:Body>
</soap:Envelope>
```

Sample SetAccessPointMode Response:

```
HTTP/1.1 200 OK
Content-Type: text/xml; charset=utf-8
Content-Length: <Number of Bytes/Octets in the Body>
<?xml version="1.0" encoding="utf-8"?>
<soap:Envelope xmlns:xsi="http://www.w3.org/2001/XMLSchema-instance"
  xmlns:xsd="http://www.w3.org/2001/XMLSchema"
  xmlns:soap="http://schemas.xmlsoap.org/soap/envelope/">
    <soap:Body>
        <SetAccessPointModeResponse xmlns="http://purenetworks.com/HNAP1/">
            <SetAccessPointModeResult>string</SetAccessPointModeResult>
            <NewIPAddress>string</NewIPAddress>
        </SetAccessPointModeResponse>
    </soap:Body>
</soap:Envelope>
```

CONCLUSION

From the foregoing description, it should be appreciated that various examples of the invention provide a protocol for retrieving information from and sending information to a network device. Further, this communication protocol can be employed by any desired client. In this manner, a client, such as a network device setup utility or network management tool, can obtain information about a network device hosting a network device management tool according to an embodiment of the invention. Further, a client can send information to a network device management tool according to an embodiment of the invention. With some implementations of the invention, this information may include both new setting values for the network device hosting the network device management tool, and instructions to employ those setting values in the future operation of the network device.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of providing information for a network device, comprising:

receiving a simple object access protocol (SOAP) request at a network device for information; and in response to receiving the request, transmitting a reply confirming that the network device includes a network device management tool, the network device management tool being configured to include in the reply an operational status of the network device, an Internet Protocol (IP) address associated with the network device, and an identity of a manufacturer of the network device, the reply being provided as an XML block such that specified information in the reply is included as a series of tagged values, the network device management tool being configured to provide a network map of network connections in a local area network, wherein the map further includes an identification of additional devices connected to the local area network and their respective operational status.

2. The method of claim 1, wherein the request for information employs an HTTP GET request.

3. The method of claim 2, wherein the reply to the request includes results of a method call referenced in the request.

4. The method of claim 3, wherein the method is a request to obtain values of settings associated with the network device.

5. The method of claim 2, wherein the HTTP GET request is received without authentication at a Universal Resource Locator address hosted by the network device.

6. The method of claim 1, wherein the request for includes an instruction for the network device to perform an operation.

7. The method of claim 6, wherein the request to perform an operation includes an HTTP POST to a web server hosted by the network device.

8. The method of claim 7, wherein the request to perform an operation includes a message header and a message body.

9. The method of claim 6, further comprising transmitting data referenced in the request.

10. The method of claim 9, wherein the transmitted data includes one or more setting values that are to be employed by the network device in performing the operation.

11. The method of claim 6, wherein the operation includes changing a setting on the network device.

12. The method of claim 1, further comprising receiving the request from a network device setup tool configured to setup the network device for operation.

13. The method of claim 12, further comprising:
receiving setting values for setting up the network device, and implementing the setting values on the network device.

14. The method of claim 1, wherein the reply to the request from the network device includes a message selected from the group consisting of: a message indicating that the request was properly handled, a message indicating the request was not properly handled, a message indicating the request was properly handled and the network device is going to restart to implement setting values specified in the request, and a message indicating that the request attempted to set more setting values for the network device than supported by the network device management tool.

15. The method of claim 1, wherein the reply to the request includes a message indicating the request was properly handled.

16. The method of claim 1, further comprising:
restarting the network device prior to transmitting the reply.

17. The method of claim 1, further comprising receiving the request from a network management tool that manages a one or more devices in network associated with the network device.

18. A network device, comprising:
a memory containing one or more setting values associated with the operation of the network device; and
a network management tool configured to
receive simple object access protocol (SOAP) requests from a client to retrieve existing information from the memory,
retrieve the existing information from the memory,
provide a reply to the requests with the existing information retrieved from the memory, the network device management tool being configured to include in the reply an operational status of the network device, an Internet Protocol (IP) address associated with the network device, and an identity of a manufacturer of the network device, the reply being provided as an XML block such that specified information in the reply is included as a series of tagged values, and
provide a network map of network connections in a local area network, wherein the map further includes an identification of additional devices connected to the local area network and their respective operational status.

19. The network device of claim 18, wherein the network management tool is further configured to
receive requests from a client contain instructions to enter new information into the memory and the new information to be entered into the memory, and
reply to the requests by entering the new information into the memory.

20. A system for configuring a network device for a network comprising:
a network device including a network device management tool being configured to receive an HTTP GET request from a remote computing device that inquires as to whether the network device includes the network device management tool, the network device management tool being further configured to include, in a reply to the remote computing device, an operational status of the network device, an Internet Protocol (IP) address associated with the network device, and an identity of a manufacturer of the network device, the reply being provided as an XML block such that specified information in the reply is included as a series of tagged values, the network device management tool being configured to provide a network map of network connections in a local area network, wherein the map further includes an identification of additional devices connected to the local area network and their respective operational status.

* * * * *